Nov. 18, 1958 D. M. CAME 2,860,877

AUTOMATIC BOWLING PIN SETTERS

Filed June 11, 1952 17 Sheets-Sheet 1

INVENTOR:
DONALD M. CAME,
BY Charles E. Ruby
ATTORNEY.

INVENTOR:
DONALD M. CAME,
BY Charles E. Ruby
ATTORNEY.

Nov. 18, 1958

D. M. CAME 2,860,877

AUTOMATIC BOWLING PIN SETTERS

Filed June 11, 1952

17 Sheets-Sheet 3

INVENTOR:
DONALD M. CAME,
BY Charles E. Ruby
ATTORNEY.

Nov. 18, 1958 D. M. CAME 2,860,877

AUTOMATIC BOWLING PIN SETTERS

Filed June 11, 1952

17 Sheets-Sheet 4

INVENTOR:
DONALD M. CAME,
BY Charles E. Ruby
ATTORNEY.

Nov. 18, 1958 D. M. CAME 2,860,877

AUTOMATIC BOWLING PIN SETTERS

Filed June 11, 1952 17 Sheets-Sheet 5

INVENTOR:
DONALD M. CAME,
BY Charles E. Ruby
ATTORNEY.

INVENTOR:
DONALD M. CAME,
BY Charles E. Ruby
ATTORNEY.

Nov. 18, 1958 D. M. CAME 2,860,877

AUTOMATIC BOWLING PIN SETTERS

Filed June 11, 1952 17 Sheets-Sheet 7

INVENTOR:
DONALD M. CAME,
BY Charles E. Ruby
ATTORNEY.

AUTOMATIC BOWLING PIN SETTERS

Filed June 11, 1952 17 Sheets-Sheet 8

INVENTOR:
DONALD M. CAME,
BY Charles E. Ruby
ATTORNEY.

Nov. 18, 1958 D. M. CAME 2,860,877
AUTOMATIC BOWLING PIN SETTERS
Filed June 11, 1952 17 Sheets-Sheet 9

INVENTOR:
DONALD M. CAME
BY Charles E. Ruby ATTORNEY.

Nov. 18, 1958 D. M. CAME 2,860,877

AUTOMATIC BOWLING PIN SETTERS

Filed June 11, 1952 17 Sheets-Sheet 10

INVENTOR:
DONALD M. CAME,
BY Charles E. Riley
ATTORNEY.

INVENTOR:
DONALD M. CAME,
BY Charles E. Riley
ATTORNEY.

INVENTOR:
DONALD M. CAME,
BY Charles E. Ruby
ATTORNEY.

AUTOMATIC BOWLING PIN SETTERS

INVENTOR:
DONALD M. CAME,
BY Charles E. Ruby
ATTORNEY.

INVENTOR:
DONALD M. CAME,
BY Charles E. Ruby
ATTORNEY.

Nov. 18, 1958 D. M. CAME 2,860,877

AUTOMATIC BOWLING PIN SETTERS

Filed June 11, 1952 17 Sheets-Sheet 15

INVENTOR:
DONALD M. CAME,
BY Charles E. Riely
ATTORNEY

Nov. 18, 1958 D. M. CAME 2,860,877

AUTOMATIC BOWLING PIN SETTERS

Filed June 11, 1952 17 Sheets-Sheet 16

INVENTOR:
DONALD M. CAME,
BY Charles E. Ruby ATTORNEY.

AUTOMATIC BOWLING PIN SETTERS

Filed June 11, 1952 17 Sheets-Sheet 17

INVENTOR:
DONALD M. CAME,
BY Charles E. Ruby
ATTORNEY.

United States Patent Office 2,860,877

Patented Nov. 18, 1958

2,860,877

AUTOMATIC BOWLING PIN SETTERS

Donald M. Came, Needham, Mass.

Application June 11, 1952, Serial No. 292,900

13 Claims. (Cl. 273—43)

The present invention relates generally to automatic bowling pin setters, so-called, for use in connection with standard bowling alleys comprising bowling alley beds, gutters, kickbacks, pits and bumpers; more particularly to improved mechanisms for the resetting of bowling pins upon the bowling alley bed; and specifically to a bowling pins transfer mechanism for transferring bowling pins from a bowling pins and balls separating mechanism to a bowling pins setting mechanism, and to a bowling pins setting mechanism for setting bowling pins upon the bowling alley bed.

The principal object of the present invention is to provide an automatic bowling pin-setter comprising improved mechanism for receiving bowling pins from a bowling pins and balls separating mechanism and transferring the received bowling pins to a bowling pins setting mechanism.

Another object of the present invention is to provide an automatic bowling pin setter comprising improved mechanism for setting bowling pins upon the bowling alley bed.

Another object of the present invention is to provide, in the bowling pins and balls handling mechanism, means whereby one set of bowling pins is held in readiness during the setting of another set of bowling pins upon the bowling alley bed by the improved bowling pins setting mechanism and then is delivered to and into the improved bowling pins setting mechanism during the returning of the improved bowling pins handling mechanism from its bowling pin-setting position to its rest position.

The attainment of these and other objects of the present invention by the present invention will become apparent to anyone skilled in the art upon examination of the following specification and the accompanying drawings constituting portions thereof wherein are described and illustrated a preferred embodiment of the present invention and variants of portions thereof coming within the scope of claims appended to the specification.

Throughout the specification and the claims appended thereto and in the accompanying drawings, the following definitions shall prevail:

(*a*) Right-hand and left-hand orientation of the present invention shall be taken to be that of the bowler viewing the present invention from the bowler's position.

(*b*) The front and the rear of the present invention shall be taken to refer to the part of the present invention nearest and the part of the present invention farthest, respectively, from the bowler viewing the present invention from the bowler's position.

(*c*) All references to bowling pin numbers shall be taken to refer to the bowling pins as they are set for play upon the bowling alley bed and the bowling pin numbers shall read from left to right and progressively along the bowling alley bed, the No. 1 bowling pin being the bowling pin nearest the bowler viewing the present invention from the bowler's position.

(*d*) The phrase, "bearingly secured," shall be taken to mean the securing of one member to another member in such manner or manners as to permit rotational movement of the one member in relation to the other member in one or more planes, as by means of pin, bolt, shoulder screw, pivot, bearing block or bearing strap, or the carrying of the one member in the bushing or bearing of the other member.

(*e*) The phrase, "bearingly connected by link," shall be taken to mean the interconnection of two members by a link, one end of which link is bearingly secured to the one member and the other end of which link is bearingly secured to the other member.

In the accompanying drawings:

Fig. 1 is a right-hand side elevation of the present invention, installed in a standard bowling alley, showing the several component mechanisms in the positions maintained during play and showing in broken lines a second representation of the sweep mechanism in its rear position after the sweeping thereby of the bowling pins and balls from the bowling alley bed and gutters into the bowling pins and balls collecting chamber of the bowling pins and balls lift.

Fig. 2 is a right-hand side elevation of the present invention, installed in a standard bowling alley, showing the several component mechanisms in the positions attained at an early stage of or in the cycle of operations of the present invention, with the sweep mechanism shown in the guard position, the bowling pins and balls handling mechanism shown in its lowest position, with the latches of the bowling pins setting chambers units released, and the bowling pins and balls lift shown in its highest, most forward and most tilted position, with the bowling pins and balls collecting chamber in extended and outwardly deformed position.

Fig. 3 is a right-hand side elevation of the present invention, installed in a standard bowling alley, showing the several component mechanisms in the positions attained at the next stage of or in the cycle of operations of the present invention, with the bowling pins and balls handling mechanism shown elevated above the bowling pins set in positions upon the bowling alley bed and the bowling pins and balls lift shown in partial return to the bowling alley pit, with the bowling pins and balls collecting chamber in retracted and inwardy deformed position.

Fig. 4 is a right-hand side elevation of the present invention, installed in a standard bowling alley, showing the several component mechanisms in the positions attained at the next stage of or in the cycle of operations of the present invention, with the bowling pins and balls handling mechanism shown at a higher elevation, the main cam followers shown in contact with the lower angle surfaces of the main cams, the bowling pins setting chambers subframes shown partially displaced angularly and downwardly, and the bowling pins setting chambers shown partially replaced angularly and upwardly.

Fig. 5 is a right-hand side elevation of the present invention, installed in a standard bowling alley, showing the several component mechanisms in the positions attained at the next stage of or in the cycle of operations of the present invention, with the bowling pins and balls handling mechanism shown at a still higher elevation, the main cam followers shown in contact with the rearmost (dwell) surfaces of the main cams, the bowling pins setting chambers sub-frames and the bowling pins transfer shelf shown in their positions of maximum downward angular displacements, the bowling pins setting chambers shown wholly replaced angularly and upwardly in planes parallel with their bowling pins setting chambers subframes, and a bowling pin shown as being displaced, longitudinally and slidingly, by gravity from the bowling pins transfer shelf into a bowling pin setting chamber of the rear bowling pins setting chambers unit.

Figures 27, 29, 30:
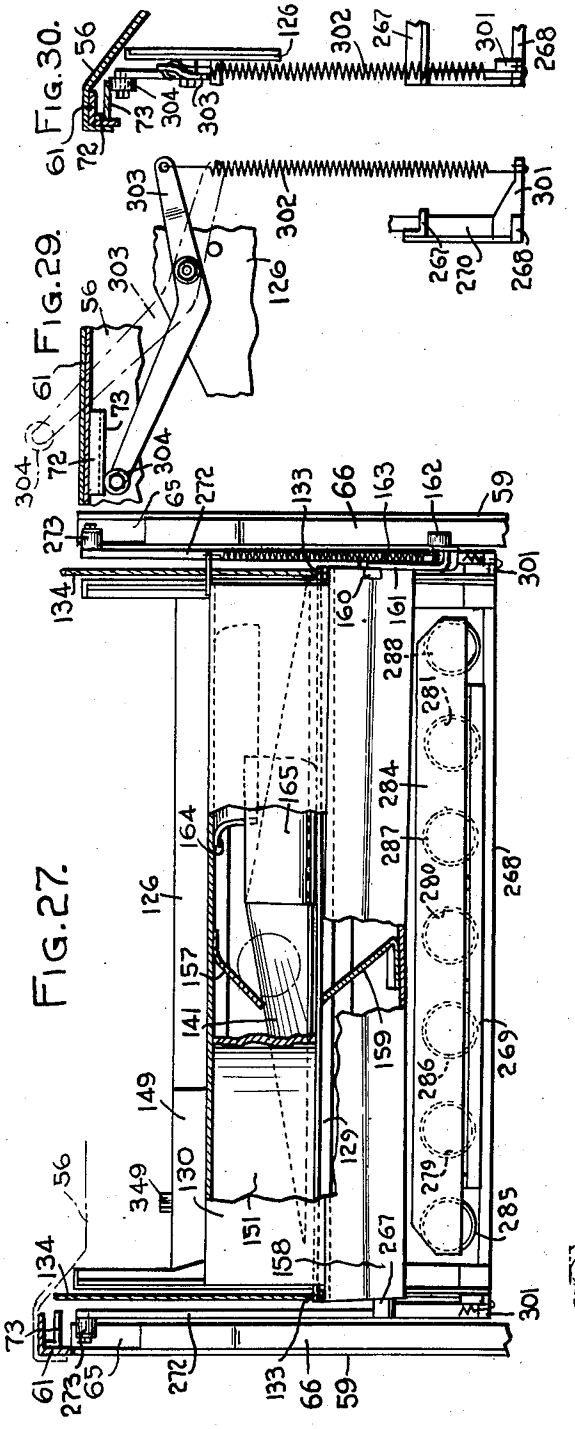
Fig. 27 is a rear elevation of the bowling pins and balls handling mechanism, in part broken away to show the bowling balls receiving recess and the bowling balls adjustable baffle.

Fig. 29 is a right-hand side elevation of a spring-tensioning cam lever arm and one of the rear sub-frame leveling lever arms interconnected by and with one of the leveling springs, showing the position of the spring-tensioning cam lever arm when the bowling pins and balls handling mechanism is in the position maintained during play, and showing, in broken lines, the position of the spring-tensioning cam lever arm when the bowling pins and balls handling mechanism is in a position below the position of the bowling pins and balls handling mechanism maintained during play.

Fig. 30 is a rear elevation of the spring-tensioning cam lever arm and one of the rear sub-frame leveling lever arms, interconnected by and with one of the leveling springs, showing their positions when and as the bowling pins and balls handling mechanism is in the position maintained during play.

Figures 7, 7A, 50, 51, 52:
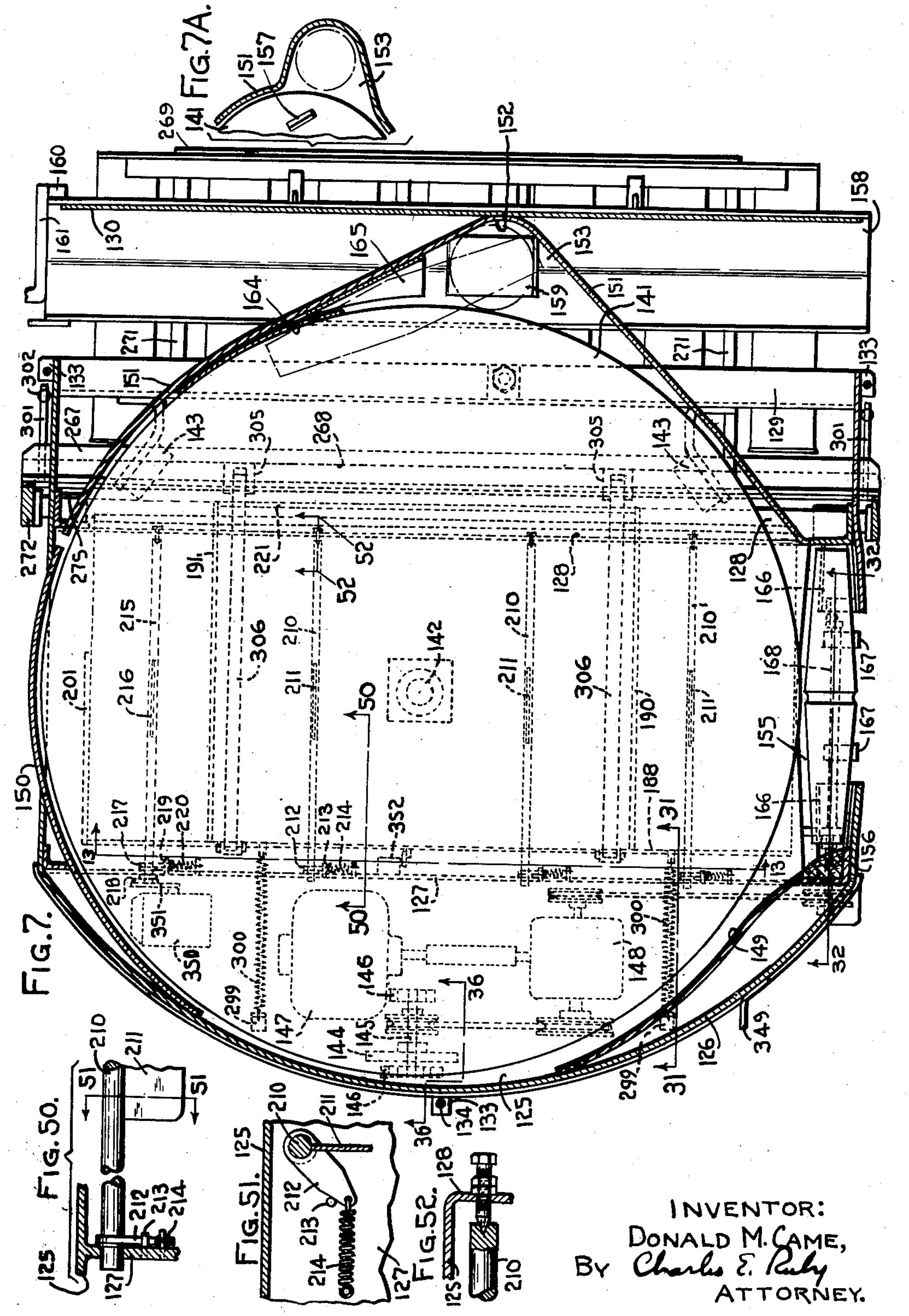
Fig. 7 is a plan view, in section along the line 7, 7, of Fig. 1, of the bowling pins and balls handling mechanism, showing the bowling balls receiving recess, the bowling pins receiving recess, and the circular rotatable floor of the bowling pins and ball receiving chamber of the bowling pins and balls separating mechanism.
Fig. 7A is a plan view of the rear portion of the bowling pins and balls handling mechanism, showing another form of the bowling balls receiving recess which is particularly adapted for use with bowling balls of the larger sizes.
Figures 8, 9, 10, 11, 12:
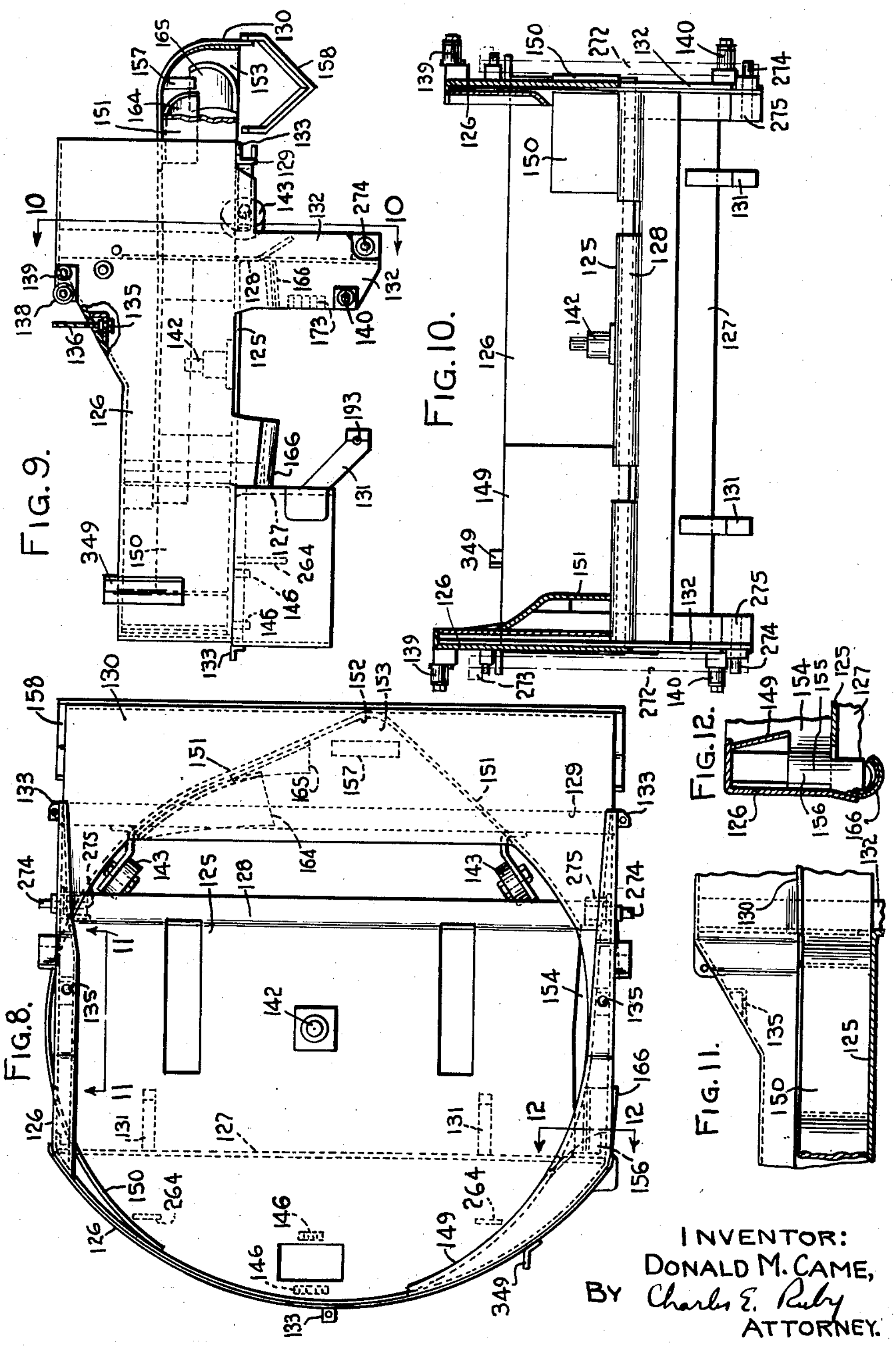
Fig. 8 is a plan view of the main frame of the bowling pins and balls handling mechanism.
Fig. 9 is a right-hand side elevation of the main frame of the bowling pins and balls handling mechanism, in part broken away to show details thereof.
Fig. 10 is a rear elevation, in section along the line 10, 10, of Fig. 9, of the main frame of the bowling pins and balls handling mechanism.
Fig. 11 is a right-hand side elevation, in section along the line 11, 11, of Fig. 8, of the main frame of the bowling pins and balls handling mechanism.
Fig. 12 is a rear elevation, in section along the line 12, 12, of Fig. 8, of the main frame of the bowling pins and balls handling mechanism, showing details of the bowling pins receiving recess.
Figure 31:
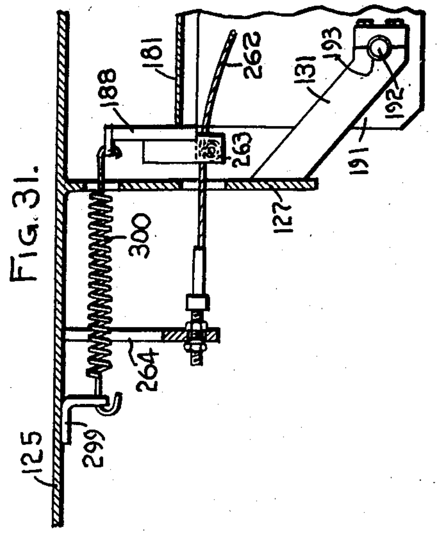
Figure 28:
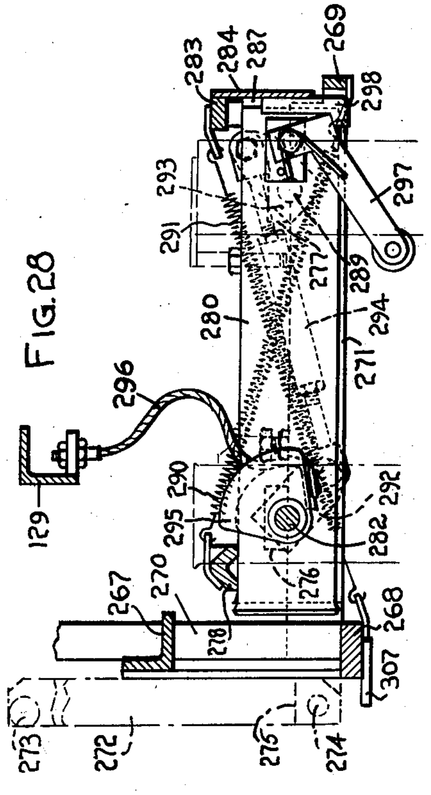
Fig. 28 is a right-hand side elevation, partly in section along the line 28, 28, of Fig. 15, of the rear bowling pins setting chambers unit, showing the quadrant resetting pulley and one of the bowling pins setting chambers spring-actuated latch members, and, in broken lines, two rear bowling pins setting chambers in vertical positions.

Fig. 31 is a right-hand side elevation, partly in section along the line 31, 31, of Fig. 7, of a portion of the main frame, the front portion of the bowling pins transfer shelf, and a portion of the front bowling pins setting chambers unit, showing their modes and manners of interrelation.

Figures 32, 33, 34, 35, 36:
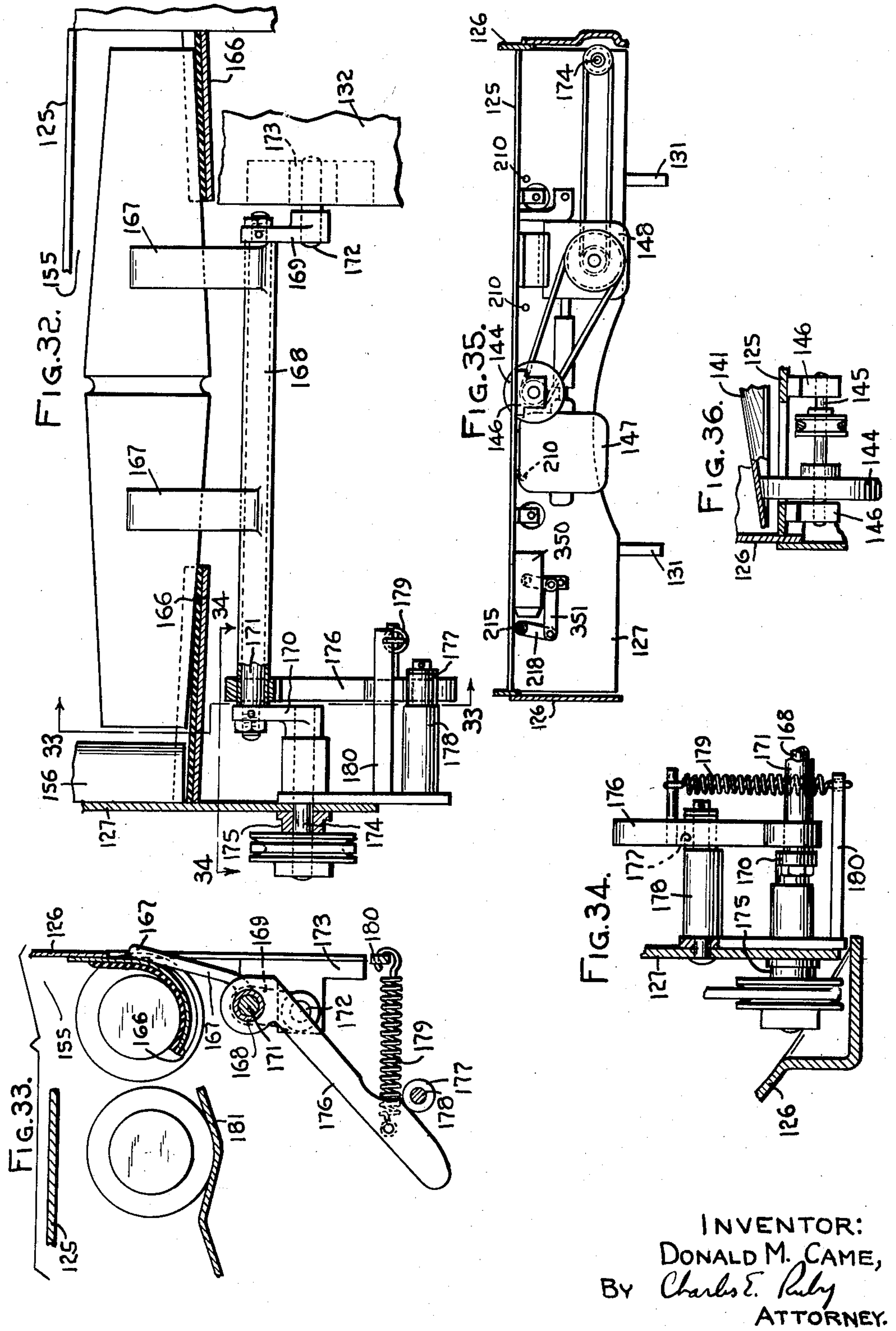

Fig. 32 is a right-hand side elevation, partly in section along the line 32, 32 of Fig. 7, of the candle pins parallelizing mechanism, showing the candle pins receiving trough, the pusher members, and the means for the actuating of the pusher members.

Fig. 33 is a front elevation, partly in section along the line 33, 33, of Fig. 32, of the candle pins parallelizing mechanism, showing the candle pins receiving trough, the pusher members, and the means for the actuating of the pusher members.

Fig. 34 is a plan view, partly in section along the line 34, 34, of Fig. 32, of the front portion of the means for the actuating of the pusher members.

Fig. 35 is a front elevation of the lower portion of the bowling pins and balls handling mechanism, showing the power means for the actuating of the circular rotatable floor of the bowling pins and balls separating mechanism and the power means for the actuating of the pusher members of the candle pins parallelizing mechanism.

Fig. 36 is a right-hand side elevation, partly in section along the line 36, 36, of Fig. 7, of a portion of the means for the actuating of the circular rotatable floor of the bowling pins and balls separating mechanism, showing the driving roller thereof.

Figures 37, 38:
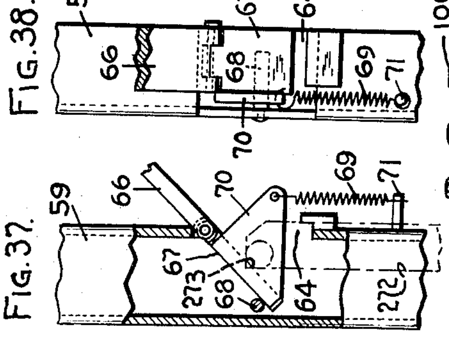

Fig. 37 is a right-hand side elevation of a main cam latch in one of the upright channel members of the supporting structure.

Fig. 38 is a rear elevation of a main cam latch in one of the upright channel members of the supporting structure.

Figure 39:
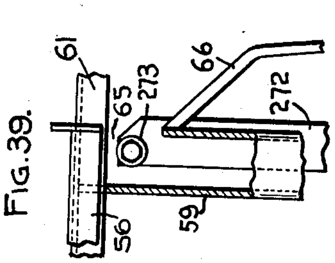

Fig. 39 is a right-hand side elevation of the upper portion of one of the upright channel members of the supporting structure partly broken away to show a main cam follower in the position maintained during play.

Figure 40:
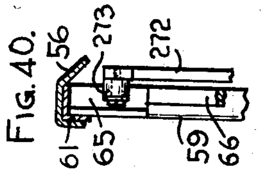

Fig. 40 is a rear elevation of the upper portion of one of the upright channel members of the supporting structure, showing a main cam follower in the position maintained during play.

Figure 41:
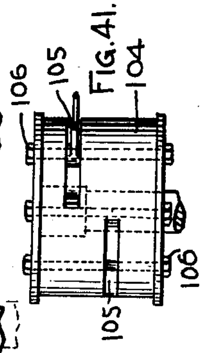

Fig. 41 is a rear elevation of the hoist drum shown in the position when the flexible hoist cables are fully unwound therefrom.

Figure 42:
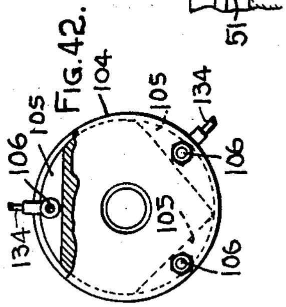

Fig. 42 is a plan view of the hoist drum shown in the position when the flexible hoist cables are fully unwound therefrom and broken away to show the mode and manner of attachment of a flexible hoist cable thereto.

Figure 43:
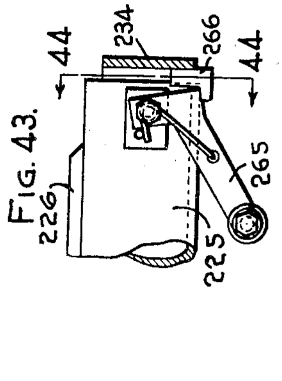

Fig. 43 is a right-hand side elevation of a spring-actuated latch member of the front bowling pins setting chambers unit.

Figure 44:
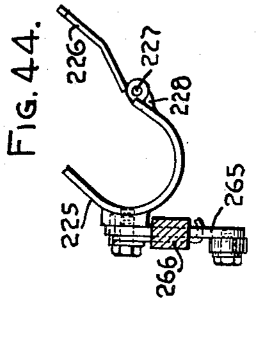

Fig. 44 is a rear elevation of a spring-actuated latch member of the front bowling pins setting chambers unit, showing the bowling pin setting chamber to which it is secured.

Figures 2, 45:
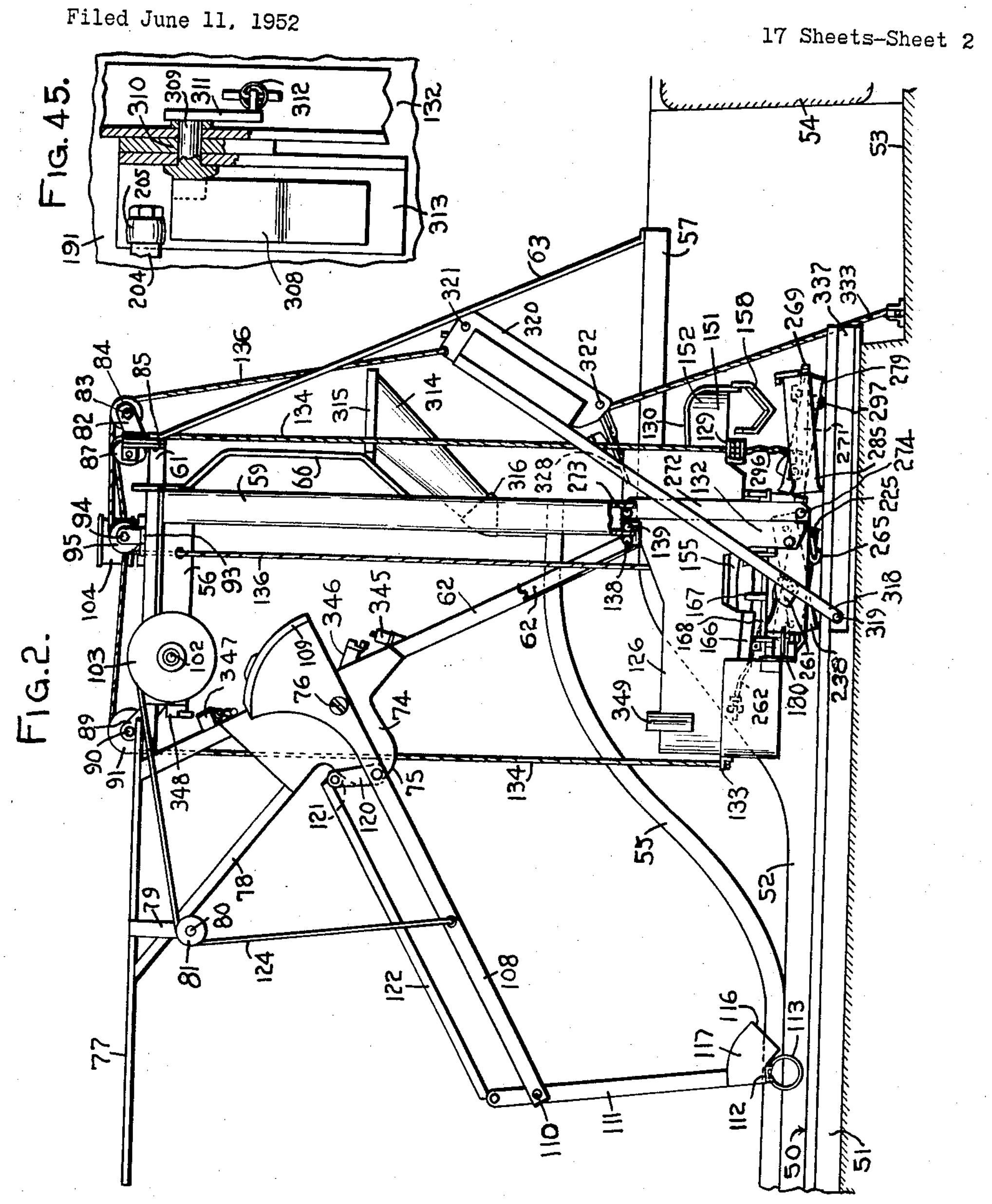

Fig. 45 is a right-hand side elevation of the bowling pins transfer shelf cam surface plate and the end of the bowling pins transfer shelf spring-actuated lever arm.

Figures 3, 46, 47:
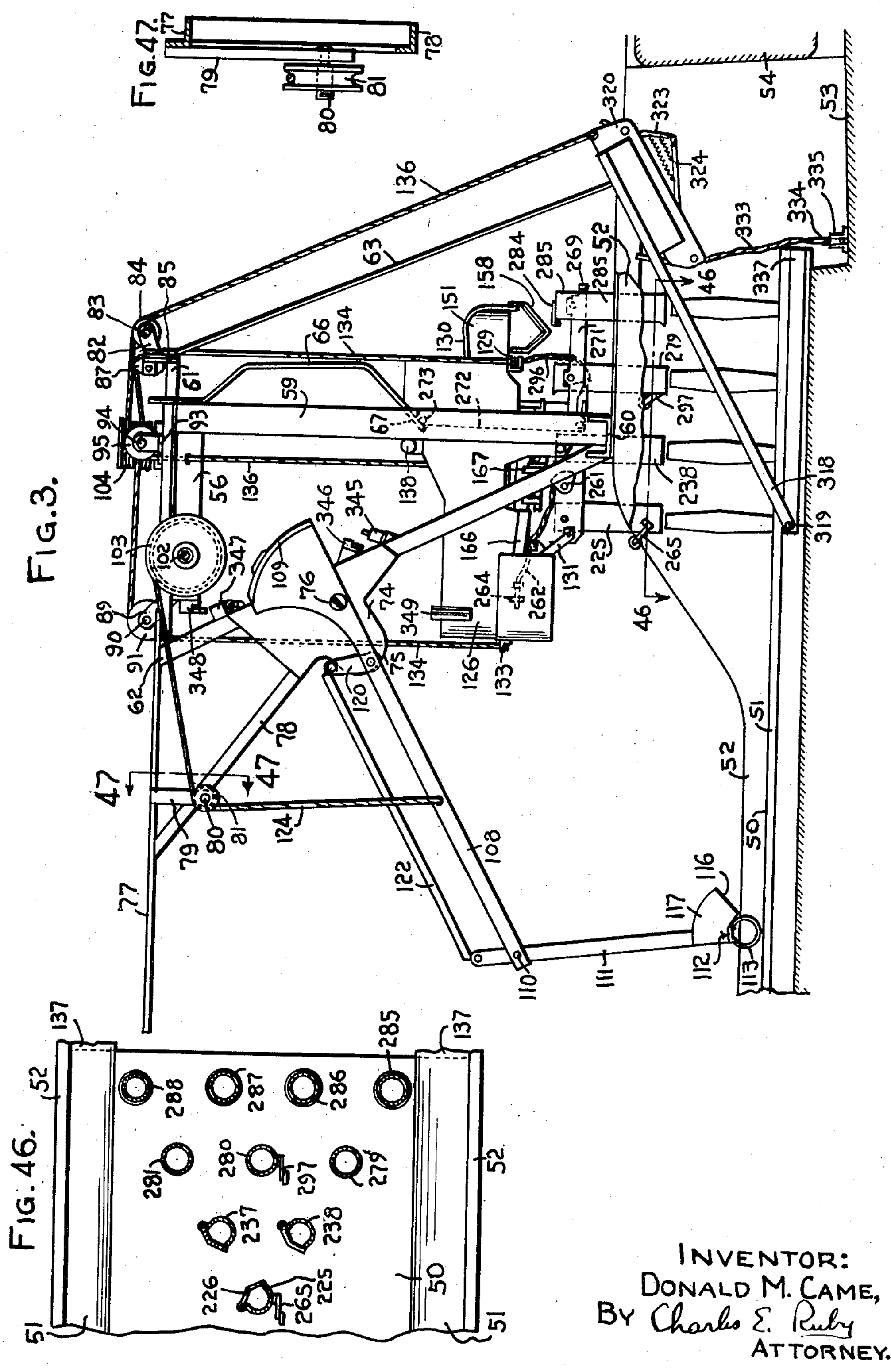

Fig. 46 is a plan view, in section along the line 46, 46, of Fig. 3, of the lower portions of the bowling pins setting chambers in vertical positions.

Fig. 47 is a rear elevation, in section along the line 47, 47, of Fig. 3, of a sweep pulley, showing the mode and manner of attachment thereof to the extension arm of the supporting structure.

Figure 4:
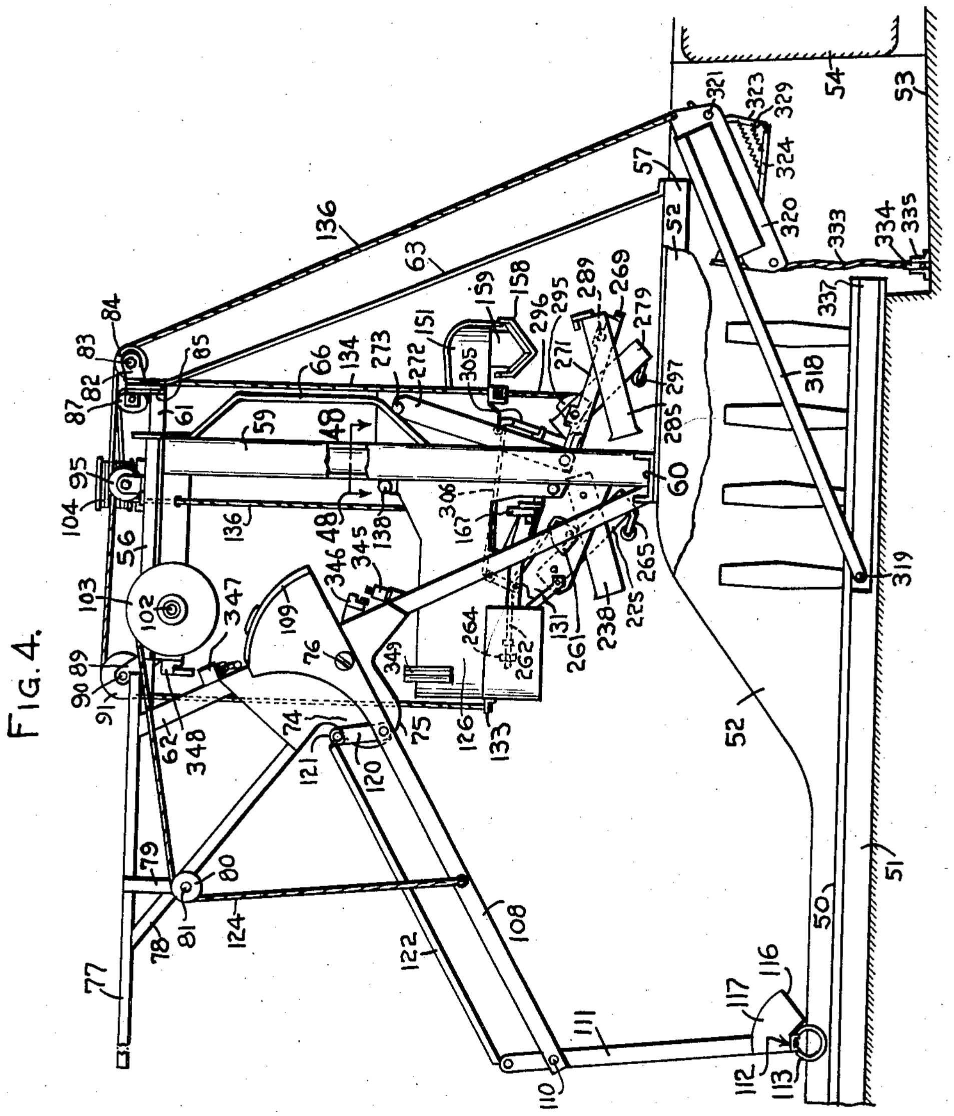
Figure 48:
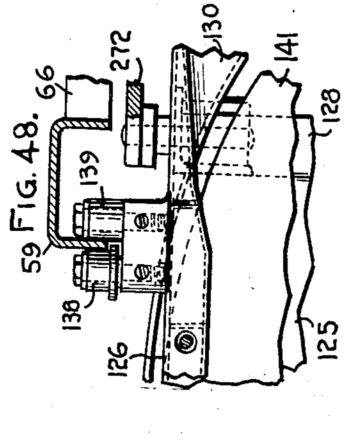

Fig. 48 is a plan view, in section along the line 48, 48, of Fig. 4, of the left-hand upright channel member of the supporting structure, showing the guide rollers of the bowling pins and balls handling mechanism for maintaining in a linear mode and manner the descent and the ascent of the bowling pins and balls handling mechanism in the supporting structure.

Figure 5:
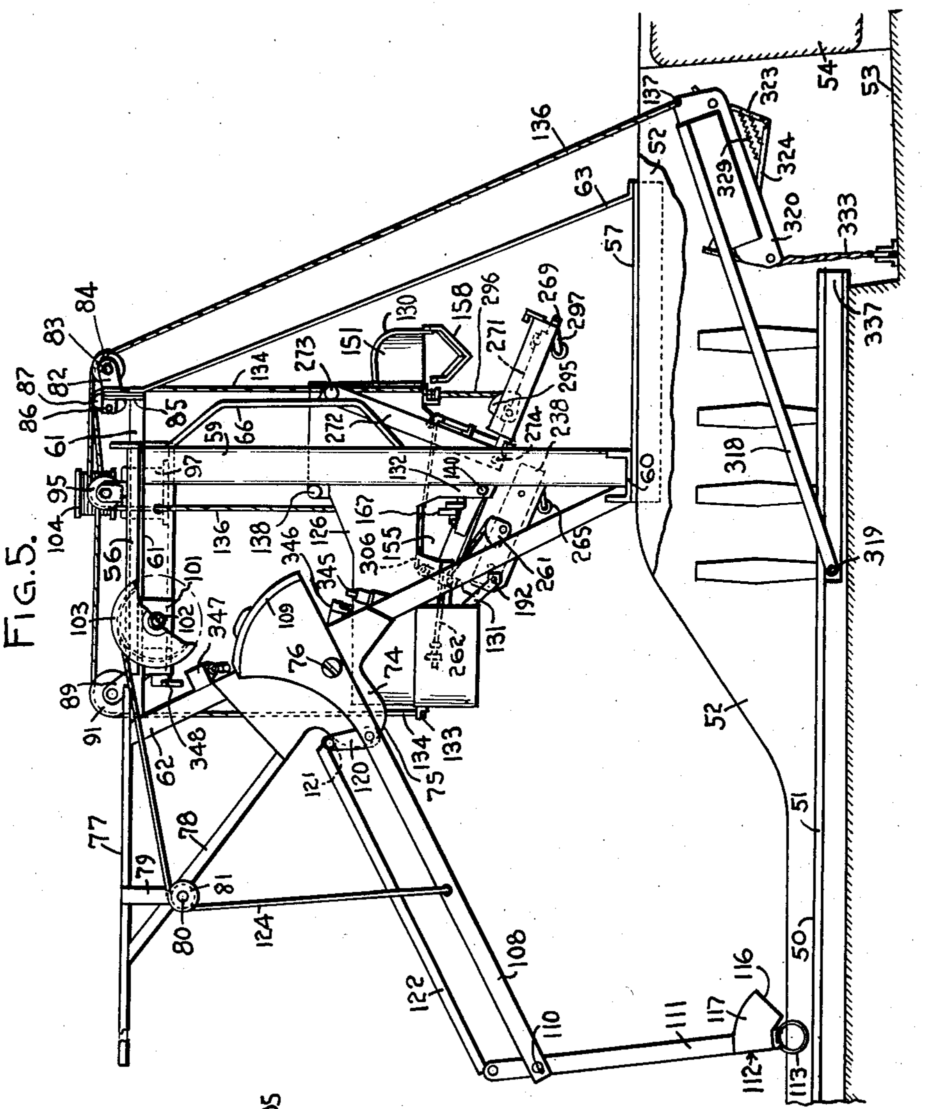
Figure 49:
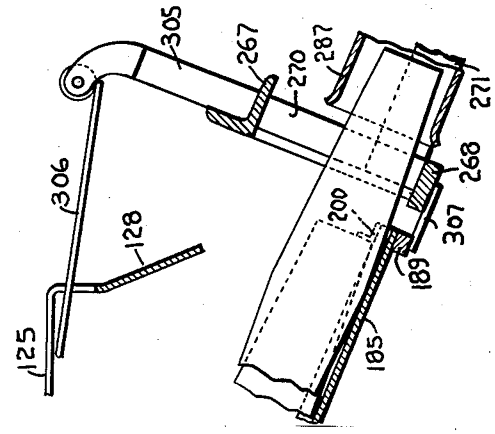

Fig. 49 is a right-hand side elevation, in section, of the rear portion of the bowling pins transfer shelf and the front portion of a bowling pin setting chamber in and of the rear bowling pins setting chambers unit, both displaced, angularly and downwardly, from and out of their horizontal positions maintained during play, showing the displacing, longitudinally and slidingly, by gravity of a candle pin from the bowling pins transfer shelf into a bowling pin setting chamber in and of the rear bowling pins setting chambers unit, being an enlargement of a portion of Fig. 5.

Fig. 50 is a right-hand side elevation, viewed from the line 50, 50, of Fig. 7, of the front portion of a candle pins aligning member.

Fig. 51 is a rear elevation, partly in section along the line 51, 51, of Fig. 50, of one of the candle pins aligning members, showing the mode and manner of the tensioning thereof by a spring.

Fig. 52 is a right-hand side elevation, partly in section along the line 52, 52, of Fig. 7, of the rear portion of a candle pins aligning member.

Figure 14:
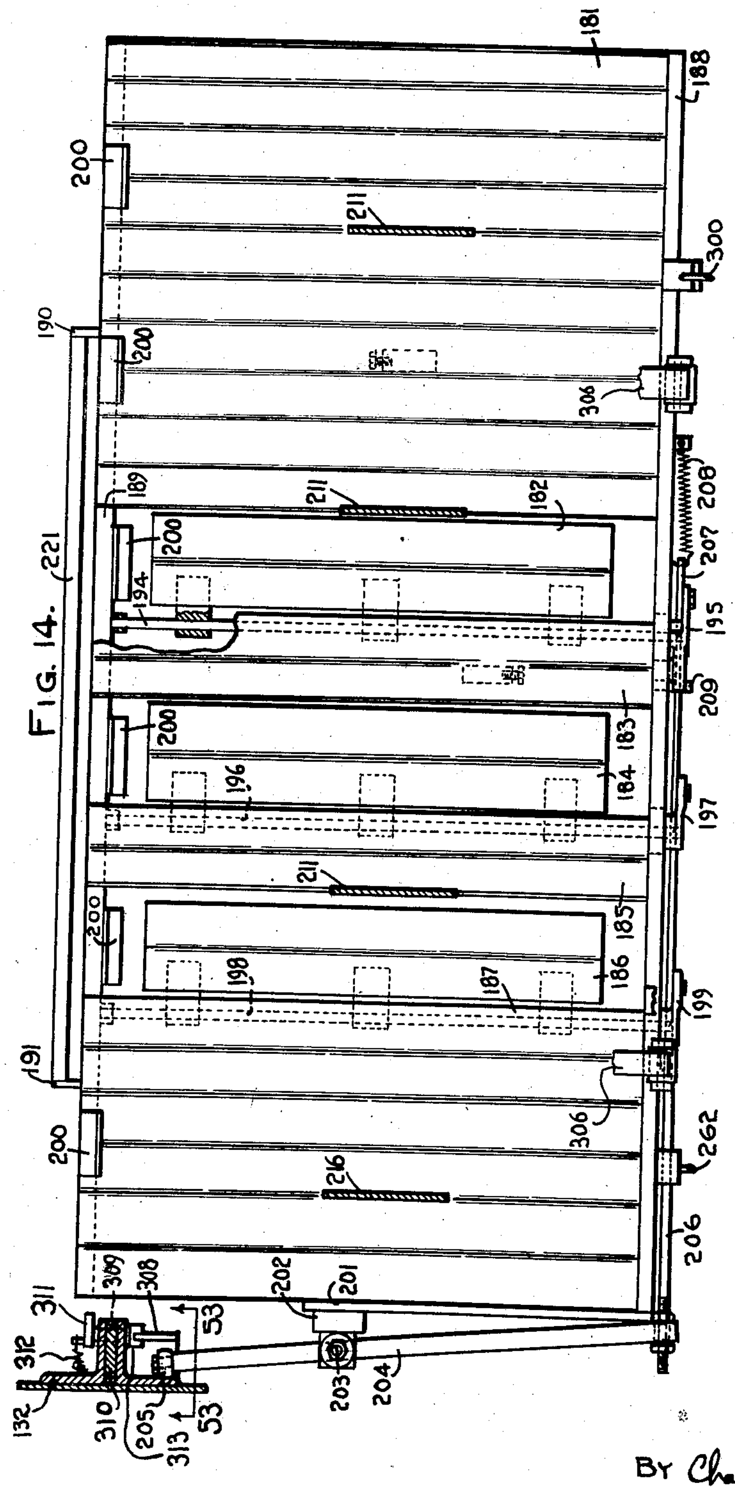
Fig. 14 is a plan view, partly in section along the line 14, 14, of Fig. 13, of a portion of the bowling pins and balls handling mechanism, showing the bowling pins transfer shelf, in part broken away to show details thereof, the three trapdoors therein, and the mechanism for the actuating of the three trapdoors.
Figure 13:
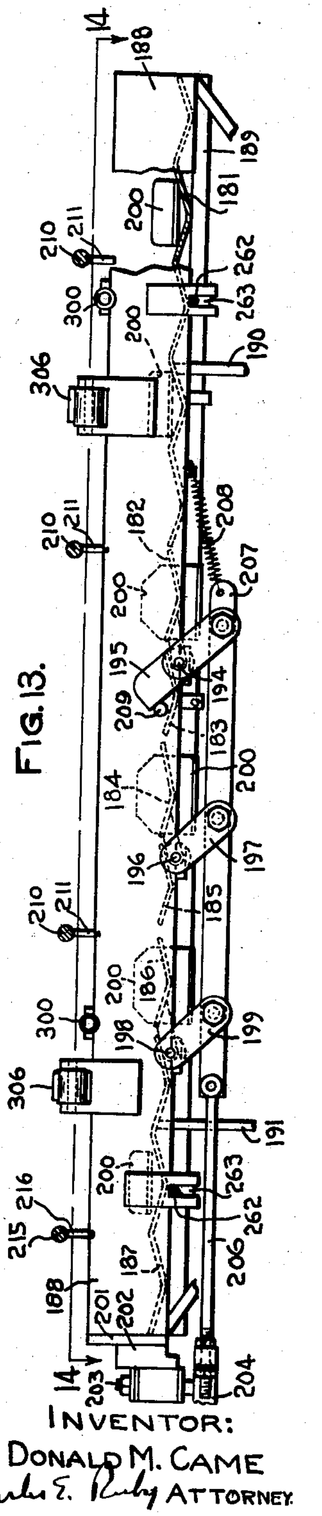
Fig. 13 is a front elevation, partly in section along the line 13, 13, of Fig. 7, of a portion of the bowling pins and balls handling mechanism, showing a front elevation of the bowling pins transfer shelf, in part broken away to show details thereof.
Figures 15, 16, 17, 18:
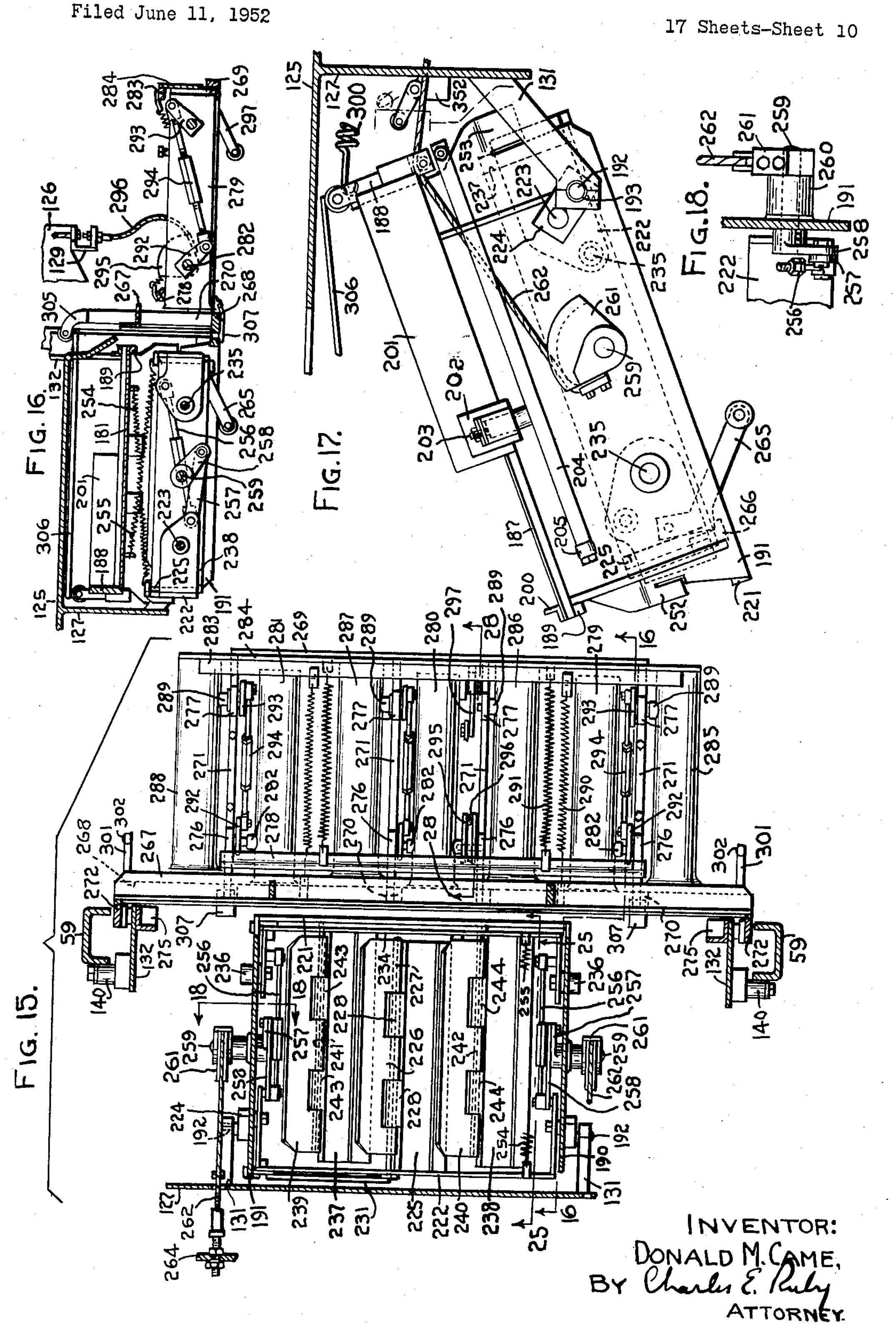
Fig. 15 is a plan view, partly in section along the line 15, 15, of Fig. 1, of a portion of the bowling pins and balls handling mechanism, showing the bowling pins setting chambers units.
Fig. 16 is a right-hand side elevation, partly in section along the line 16, 16, of Fig. 15, of a portion of the bowling pins and balls handling mechanism, showing bowling pins setting chambers of the front and the rear bowling pins setting chambers units, and, in section, the bowling pins transfer shelf.
Fig. 17 is a left-hand side elevation of the bowling pins transfer shelf and the front bowling pins setting chambers unit of the bowling pins and balls handling mechanism, shown in positions attained by displacements, angularly and downwardly, of the bowling pins transfer shelf and the front bowling pins setting chambers unit from and out of their positions shown in Fig. 16.
Fig. 18 is a rear elevation, partly in section along the line 18, 18, of Fig. 15, of a portion of the front bowling pins setting chambers unit of the bowling pins and balls handling mechanism.
Figures 19, 20, 21, 22, 23, 24, 53:
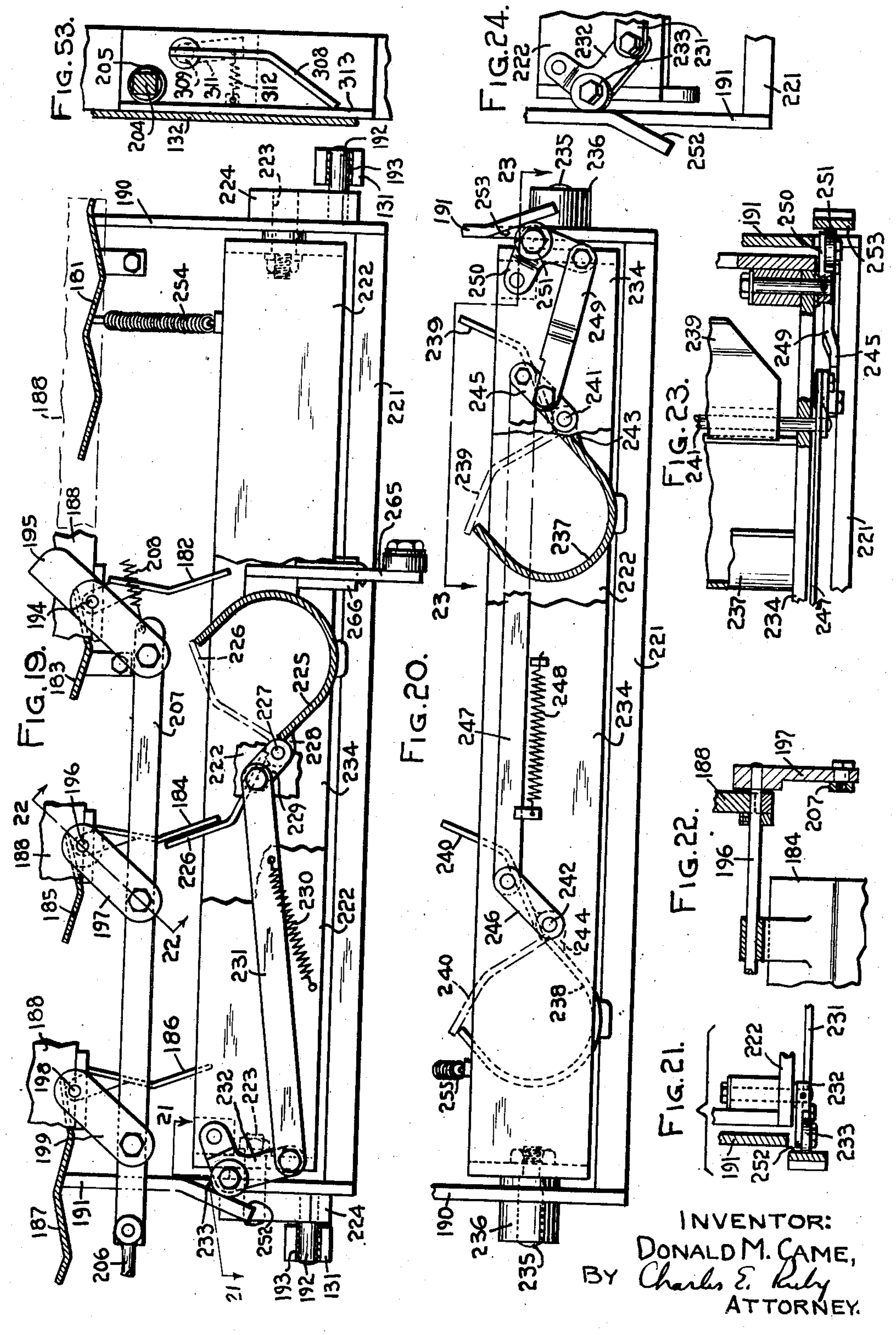
Fig. 19 is a front elevation of the front bowling pins setting chambers unit and a part of the bowling pins transfer shelf, partly broken away to show details thereof.
Fig. 20 is a rear elevation of the rear portion of the front bowling pins setting chambers unit, partly broken away to show details of a front bowling pin setting chamber, showing in broken lines front bowling pins setting chambers closed by side plates.
Fig. 21 is a plan view, in section along the line 21, 21, of Fig. 19, of the cam portion of the actuating mechanism of a front bowling pin setting chamber side plate.
Fig. 22 is a plan view, in section along the line 22, 22, of Fig. 19, of a portion of a bowling pins transfer shelf trapdoor, showing the lever arm for the actuating thereof.
Fig. 23 is a plan view, in section along the line 23, 23, of Fig. 20, of the cam portion of the actuating mechanism of two of the front bowling pins setting chambers side plates, showing a lever arm of one of the front bowling pins setting chambers side plates.
Fig. 24 is a front elevation of the cam portion of the actuating mechanism of a front bowling pin setting chamber side plate, showing the position of the cam portion after the front bowling pin setting chamber has been slightly displaced, angularly and downwardly, out of its horizontal position.

Fig. 53 is a front elevation, partly in section along the line 53, 53, of Fig. 14, of the bowling pins transfer shelf cam surface plate, showing the edge of the bowling pins transfer shelf cam surface plate.

Figures 54, 55, 56, 57:
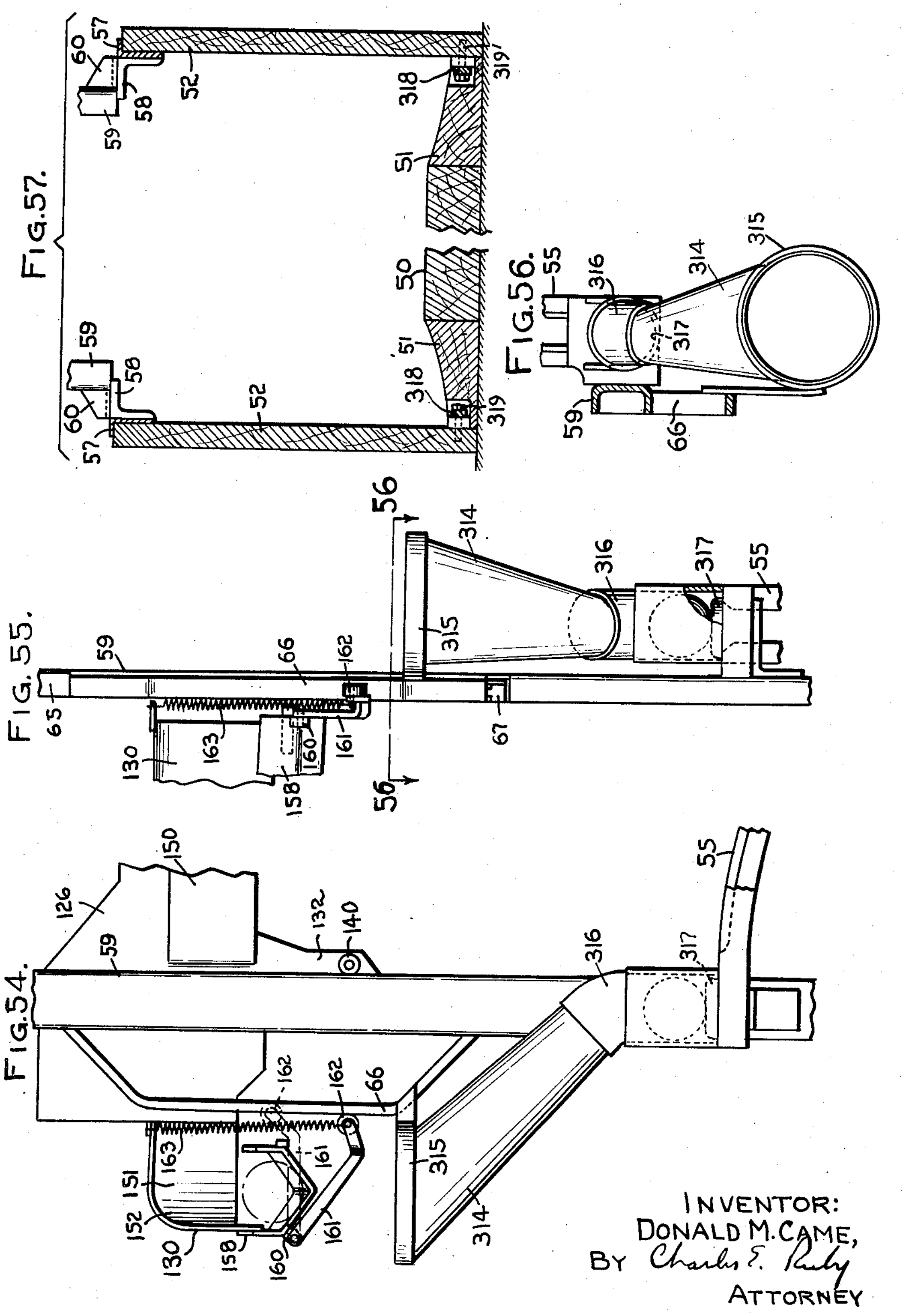

Fig. 54 is a left-hand side elevation of the rear portion of the bowling pins and balls handling mechanism supported by and in the supporting structure, showing the means for the delivering of bowling balls from the bowling pins and balls handling mechanism to the ball return.

Fig. 55 is a rear elevation of the left-hand portion of the bowling pins and balls handling mechanism supported by and in the supporting structure, showing the means for the delivering of bowling balls from the bowling pins and balls handling mechanism to the ball return.

Fig. 56 is a plan view, partly in section along the line 56, 56, of Fig. 55, of a portion of the means for the delivering of bowling balls from the bowling pins and balls handling mechanism to the ball return, showing a portion of the ball return.

Figure 1:
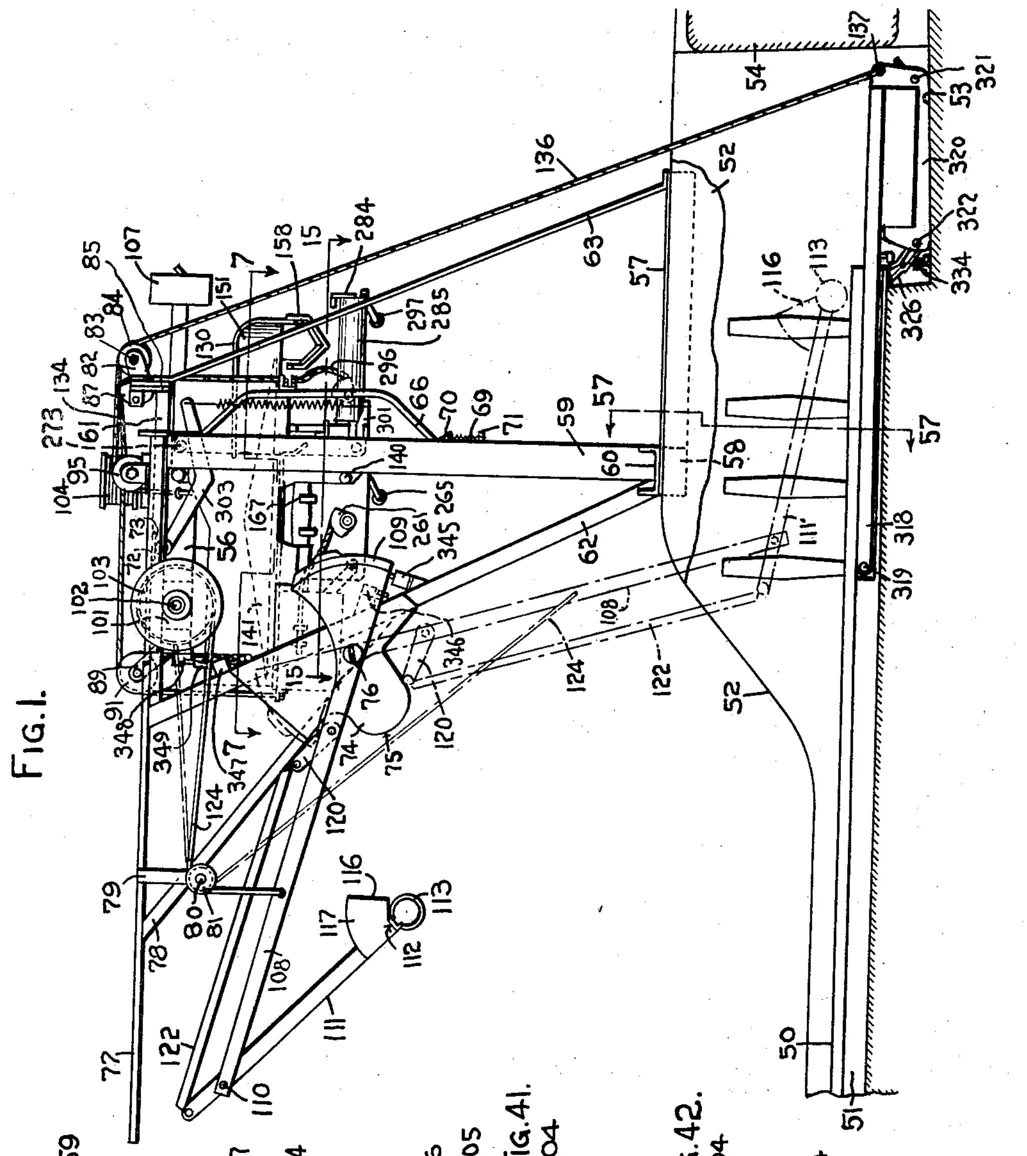

Fig. 57 is a rear elevation, partly in section along the line 57, 57, of Fig. 1, of the bowling alley bed with its central portion removed, the gutters, and the kickbacks, showing the mode and manner of attachment of the supporting structure to and upon the kickbacks and the mode and manner of attachment of the ends of the lever arms of the bowling pins and balls lift to and upon the kickbacks.

Figures 58, 59, 60, 61, 62, 63, 64, 65:
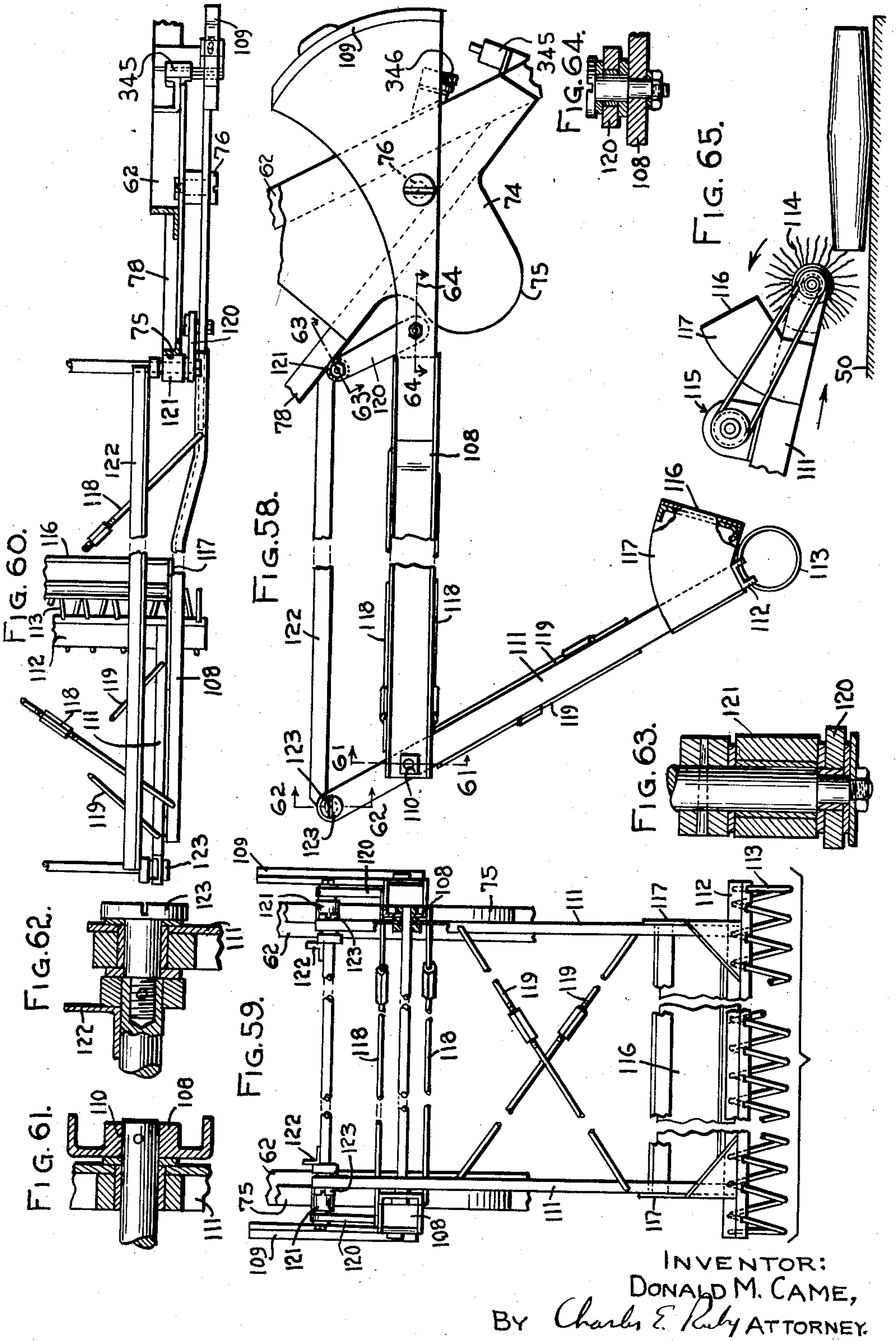

Fig. 58 is a right-hand side elevation of the sweep mechanism, showing the preferred construction of the locally yielding sweep member that comes into contact with, and sweeps from the bowling alley bed and gutters and into the bowling alley pit, bowling pins and balls.

Fig. 59 is a front elevation of the sweep mechanism, showing the preferred construction of the locally yielding sweep member that comes into contact with, and sweeps from the bowling alley bed and gutters and into the bowling alley pit, bowling pins and balls.

Fig. 60 is a plan view of the right-hand portion of the sweep mechanism, showing the preferred construction of the locally yielding sweep member that comes into contact with, and sweeps from the bowling alley bed and gutters and into the bowling alley pit, bowling pins and balls.

Fig. 61 is a front elevation, partly in section along the line 61, 61, of Fig. 58, of a portion of the sweep mechanism, showing the mode and manner of securing together lever arms thereof.

Fig. 62 is a front elevation, partly in section along the line 62, 62, of Fig. 58, of a portion of the sweep mechanism, showing the mode and manner of securing together a lever arm and a link.

Fig. 63 is a front elevation, partly in section along the line 63, 63, of Fig. 58, of a portion of the sweep mechanism, showing the mode and manner of securing together a sweep cam arm and a sweep link and showing a sweep cam roller.

Fig. 64 is a plan view, partly in section along the line 64, 64, of Fig. 58, of a portion of the sweep mechanism, showing the mode and manner of securing together a sweep cam arm and a lever arm.

Fig. 65 is a right-hand side elevation of the lower portion of the sweep mechanism, showing another construction of the locally yielding member that comes into contact with, and sweeps from the bowling alley bed and gutters and into the bowling alley pit, bowling pins and balls, and showing the means for the actuating of this construction of the locally yielding member.

Figure 6:
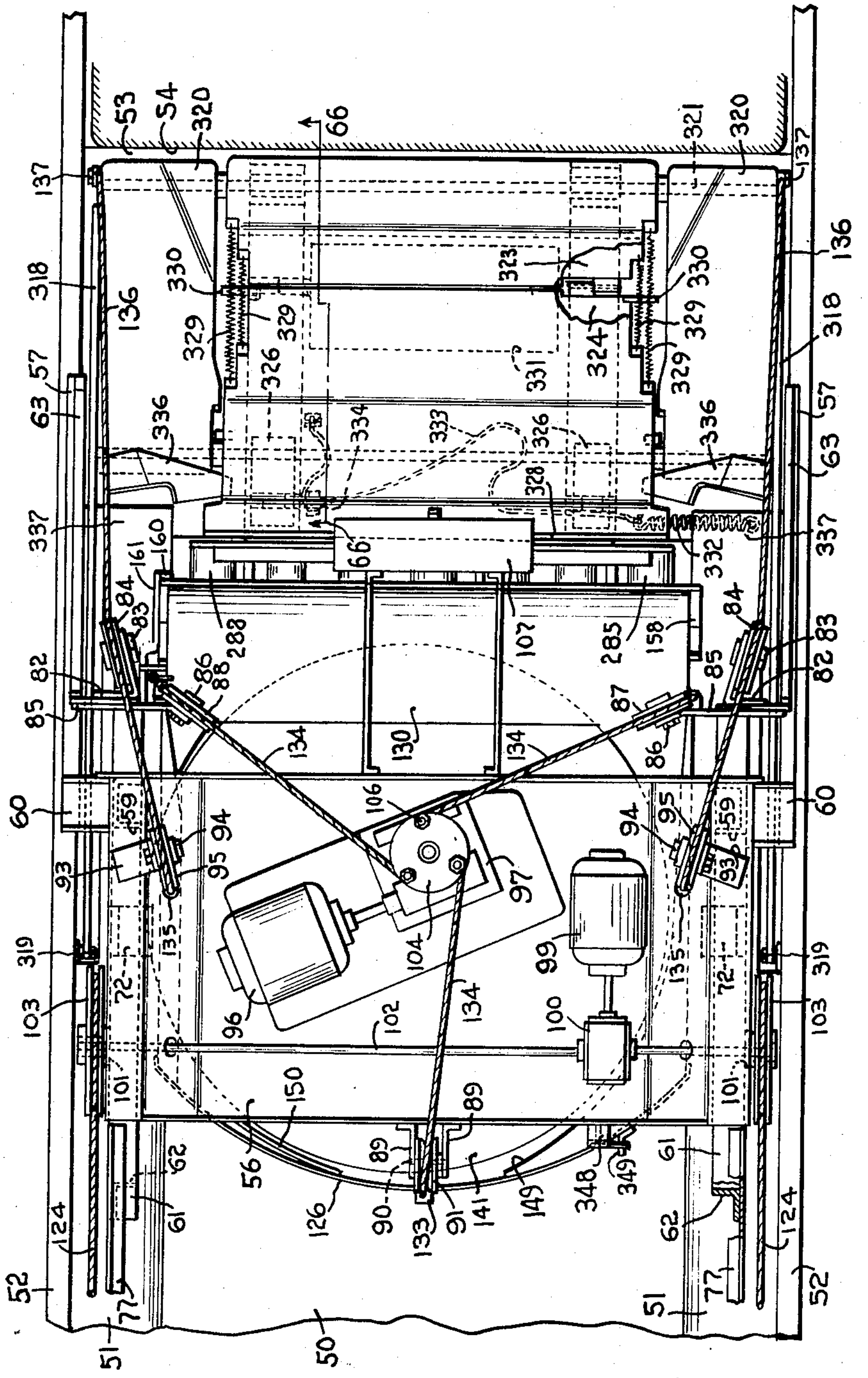
Fig. 6 is a plan view of the present invention, but with a portion of the sweep mechanism omitted, installed in a standard bowling alley, showing the several component mechanisms in the positions maintained during play and corresponding to the side elevation of the present invention shown in Fig. 1.
Figure 66:
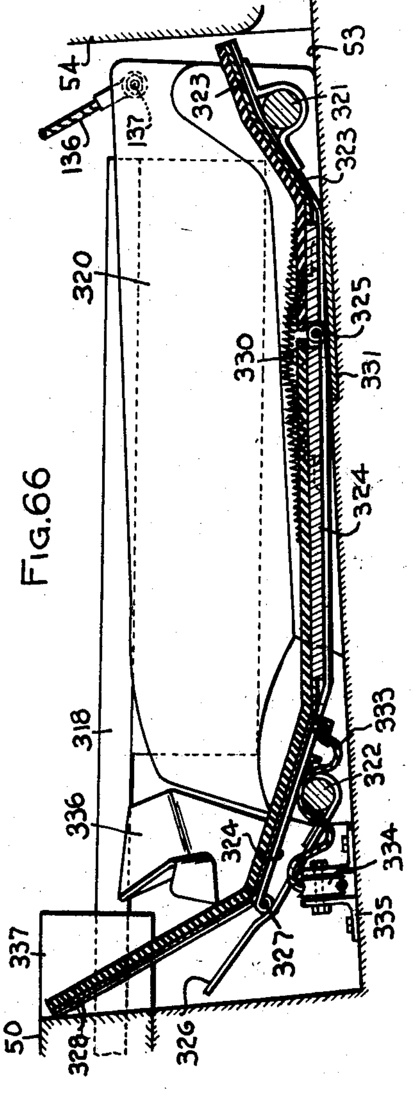

Fig. 66 is a right-hand side elevation, partly in section along the line 66, 66, of Fig. 6, of the bowling pins and balls collecting chamber of the bowling pins and balls lift, showing the bowling pins and balls collecting chamber in extended and outwardly deformed position within the bowling alley pit.

Figure 67:
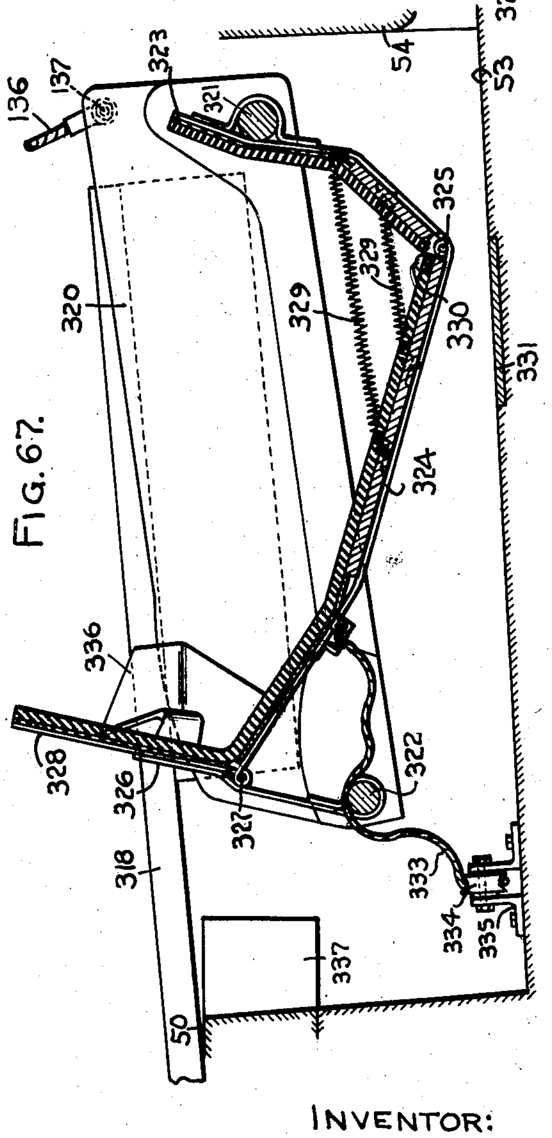

Fig. 67 is a right-hand side elevation, partly in section along substantially the line 66, 66, of Fig. 6, of the bowling pins and balls collecting chamber of the bowling pins and balls lift, but showing the bowling pins and balls collecting chamber in retracted and inwardly deformed position and partly without the bowling alley pit.

Figure 68:
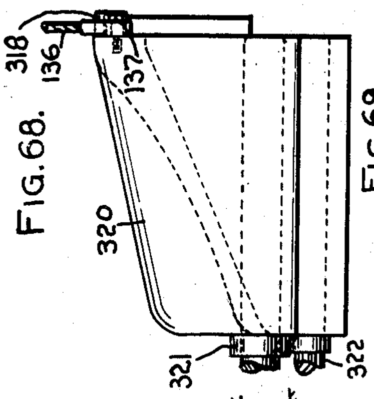

Fig. 68 is a rear elevation of the left-hand lateral member of the bowling pins and balls collecting chamber of the bowling pins and balls lift, showing the mode and manner of securing thereto one of the flexible lift cables.

Figure 69:
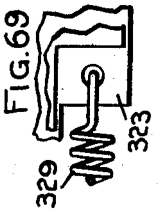

Fig. 69 is a plan view of a portion of the rear plate of the bowling pins and balls collecting chamber of the bowling pins and balls lift, showing the mode and manner of securing thereto a retracting spring.

Figure 70:
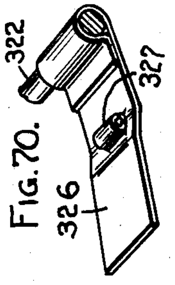

Fig. 70 is a view in perspective of one of the retracting arms of the bowling pins and balls collecting chamber of the bowling pins and balls lift.

Figure 71:
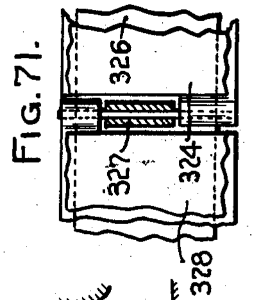

Fig. 71 is a plan view of a portion of the front plate and a portion of the middle plate of the bowling pins and balls collecting chamber of the bowling pins and balls lift, showing the mode and manner of securing them to a retracting arm.

Figures 25, 26, 72, 73, 74, 75:
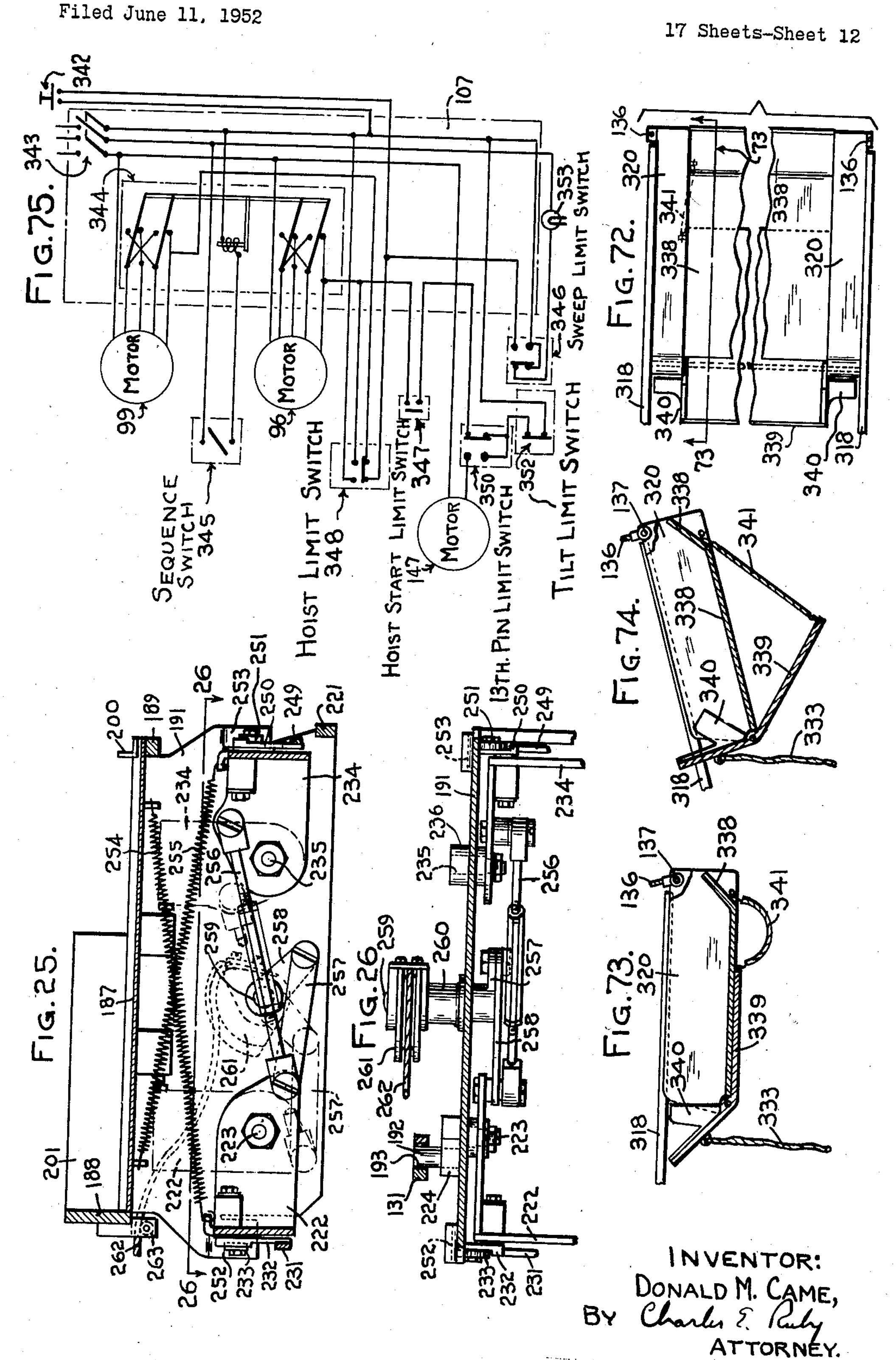
Fig. 25 is a right-hand side elevation, partly in section along the line 25, 25, of Fig. 15, of the bowling pins transfer shelf and the front bowling pins setting chambers unit, with the front bowling pins setting chambers omitted.
Fig. 26 is a plan view, partly in section along the line 26, 26 of Fig. 25, of the left-hand portion of the front bowling pins setting chambers unit.

Fig. 72 is a plan view of another construction of the bowling pins and balls collecting chamber of the bowling pins and balls lift, showing the bowling pins and balls collecting chamber in extended and outwardly deformed position within the bowling alley pit.

Fig. 73 is a right-hand side elevation, partly in section along the line 73, 73, of Fig. 72, of the alternate construction of the bowling pins and balls collecting chamber of the bowling pins and balls lift, showing the bowling pins and balls collecting chamber in extended and outwardly deformed position within the bowling alley pit.

Fig. 74 is a right-hand side elevation, partly in section along substantially the line 73, 73, of Fig. 72, of the alternate construction of the bowling pins and balls collecting chamber of the bowling pins and balls lift, but showing the bowling pins and balls collecting chamber in retracted and inwardly deformed position and partly without the bowling alley pit.

Fig. 75 is the wiring diagram of the present invention.

In the several drawings are shown the rear portion of a standard bowling alley and auxiliary constructions, comprising the bowling alley bed 50, the two gutters 51, the two kickbacks 52, the bowling alley pit with its floor 53 at the rear of the bowling alley bed 50 and the two gutters 51, the bumper 54 at the rear of the bowling alley pit, and the ball return 55. Upon the bowling alley bed 50 in Fig. 1 are shown bowling pins set in their playing positions distributed within an equilateral triangle centrally positioned between the two kickbacks 52, the bowling pins therein shown being candle pins.

*The supporting structure*

Mounted athwart the bowling alley bed 50 (herein shown mounted upon the two kickbacks 52) is the supporting structure consisting of the top hoist pan 56 and the two side frames comprising the two angle irons 57 carrying the extensions 58, the two upright channel members 59 with inwardly turned webs having their feet 60 secured to the extensions 58, the two horizontal supporting members 61 secured to the upper ends of the two upright channel members 59 and to the end portions of the top hoist pan 56, the two thrust members 62 secured to the feet 60 and to the two horizontal supporting members 61, and the two tension members 63 secured to the angle irons 57. Thus the top hoist pan 56 and the two side frames form a rigid inverted U-shaped supporting structure, hereinafter referred to as the supporting structure.

In each of the two upright channel members 59, sections of the rear inwardly turned web are cut away to form openings therein, as are shown at 64 and 65, and a main cam member 66 spans the portion of the inwardly turned web between 64 and 65, being secured to the ends thereof. The lower end of the main cam member 66 carries a main cam latch 67 bearingly secured at its upper end thereto, the main cam latch 67 in vertical position serving to close the opening in the rear inwardly turned web at 64, with its inner surface lying in the plane of the inner surface of the inwardly turned web. The main cam latch 67 is normally held displaced angularly from vertical position and against the main cam latch stop 68 by the main cam latch spring 69, one end of which is secured to a main cam latch arm 70 carried by the main cam latch 67 and the other end of which is secured to the pin 71 on the upright channel member 59. Thus the inner surface of the rear inwardly turned web of the upright channel member 59, with the main cam latch 67 in vertical position, forms a vertical cam surface within the upright channel member 59. But when the main cam latch 67 is displaced angularly from vertical position, as it is so shown to be in Fig. 37, the main cam latch 67, thus displaced angularly from vertical position, forms with, and as a part of, the outer surface of the main cam member 66 a continuous cam surface, which, as a totality, has a flattened U-shaped conformation; and the combination of this flattened U-shaped cam surface and the upright channel member 59 has the conformation of a P, as is shown in Figs. 1–5.

To each of the two horizontal supporting members 61 is secured a spring-tensioning cam plate 72 disposed parallel to its horizontal supporting member 61 and having as its lower and under surface a spring-tensioning cam surface 73.

Carried by each of the two thrust members 62 is an irregularly shaped sweep cam member 74 provided with a sweep cam surface 75 and a main sweep bearing 76. Carried by each of the two horizontal supporting members 61 and by each of the two thrust members 62 are extension arms 77 and 78 each of which supports a bearing plate 79 provided with a bearing pin 80 upon which rotates a sweep pulley 81.

Secured near the top of each of the two tension members 63 is a bearing plate 82 which carries a shoulder screw 83 upon which rotates a rear lift pulley 84. To the rear end of each of the two horizontal supporting members 61 is secured a bearing plate 85 carrying a shoulder screw 86. Upon one of the shoulder screws 86 rotates the first hoist pulley 87 and upon the other of the shoulder screws 86 rotates the second hoist pulley 88. Secured to each of the two bearing plates 85 is the upper end of a tension member 63. Mounted upon the front wall of the top hoist pan 56 are the top bearing brackets 89 which support a bearing pin 90 upon which rotates the third hoist pulley 91. Mounted upon each of the two horizontal supporting members 61 are the two bearing brackets 93 which carry the two shoulder screws 94 upon which rotate the two front lift pulleys 95.

Mounted upon the floor of the top hoist pan 56 are the reversible hoist motor 96 and the hoist gear box 97, coupled together, and the reversible sweep motor 99 and the sweep gear box 100, coupled together. Secured to each of the two horizontal supporting members 61 is a flange bearing block 101, each carrying an extension shaft 102 coupled to the sweep gear box 100. On the outer end of each extension shaft 102 is secured a sweep drum 103. Carried by the vertical driven shaft of the hoist gear box 97 is the hoist drum 104 adapted to receive three flexible cables wound or reeled thereupon in either direction and having distributed, evenly spaced along a spiral upon its surface, three slots 105, each adapted to receive a cable eye and each provided with a pin 106 to engage such cable eye. Secured to the rear wall of the top hoist pan 56 is the electrical control and junction box 107.

*The sweep mechanism*

The sweep mechanism illustrated in Figs. 1, 2, 3, 4 and 5 is shown to comprise the two first sweep lever arms 108 bearingly secured in the two main sweep bearings 76 carried by the two thrust members 62, each of the two first sweep lever arms 108 carrying at one of its ends a sweep actuating weight 109 and at the other of its ends a bearing 110 at which is bearingly secured a second sweep lever arm 111. To the lower ends of the second sweep lever arms 111 are secured the ends of a locally yielding transverse member, shown in Figs. 58, 59 and 60 to consist of a transverse brace 112 supporting an open wound spring 113, and, in Fig. 65, alternately, to consist of a cylindrical brush 114 bearingly secured to the lower ends of the two second sweep lever arms 111 and rotatable by the slow speed brush motor 115 carried by one of the second sweep lever arms 111. For the purpose of preventing bowling pins standing upon the bowling alley bed 50 from falling forwardly over the locally yielding transverse member 113 or 114 and thus escaping the action of the sweep mechanism, a supplemental sweep plate 116 is mounted above the locally yielding transverse member 113 or 114, being carried at its ends by the two brackets 117 secured to the two second sweep lever arms 111. For the purpose of attaining structural rigidity, the two cross members 118 interconnect the two first sweep lever arms 108, and, for the same purpose and to provide for lateral positioning adjustment of the locally yielding transverse member 113 or 114, the two adjustable cross members 119 interconnect the two second sweep lever arms 111.

To each of the two first sweep lever arms 108 is bearingly secured a sweep cam arm 120 to the outer end of which is bearingly secured a sweep cam roller 121 which coacts with a sweep cam surface 75 of a sweep cam member 74 carried by each of the thrust members 62 of the supporting structure. The upper end of each of the two second sweep lever arms 111 and the outer end of each of the two sweep cam arms 120 are bearingly interconnected by one of the two sweep link members 122 by means of two of the shoulder screws 123. Bearingly secured to each of the two first lever arms 108 is one end of a flexible sweep cable 124 which passes over one of the sweep pulleys 81 while the other end of the flexible sweep cable 124 is secured to one of the two sweep drums 103.

The sweep mechanism is shown in Fig. 1 in the elevated and retracted position maintained during play, the two flexible sweep cables 124 being wound or reeled upon the two sweep drums 103, and, in the representation in broken lines, in the lowered and extended position attained after the sweep mechanism has swept bowling pins and balls from the bowling alley bed 50 and gutters 51 into the collecting chamber of the bowling pins and balls lift positioned in the pit and prior to its advance forward to the guard position, the two flexible sweep cables 124 being wholly unwound or unreeled from the two sweep drums 103. In Figs. 2, 3, 4 and 5, the sweep mechanism is shown lowered and forward in the guard position maintained during the setting of the bowling pins upon the bowling alley bed 50 by the bowling pins setting mechanism, the sweep mechanism having been brought into the guard position from the position shown in the representation in broken lines in Fig. 1 by the converse winding or reeling of portions of the two flexible sweep cables 124 upon the two sweep drums 103. The return of the sweep mechanism from the guard position, shown in Figs. 2, 3, 4 and 5, to the elevated and retracted position maintained during play, shown in Fig. 1, is effectuated by further converse winding or reeling of the two flexible sweep cables 124 upon the two sweep drums 103. The construction and the coaction of the members of the sweep mechanism are such as to cause the locally yielding transverse member 113 or 114 to become lowered, to travel first backward and then forward over the bowling alley bed 50 not in contact therewith but in a path parallel thereto, to assume the guard position, and thereafter to become restored to the elevated position maintained during play. The travel of the locally yielding transverse member 113 or 114 during the last portion of its rearward movement is powered by the downward movement of the two sweep actuating weights 109.

If, in its initial movement downwardly to the sweeping position just above the surface of the bowling alley bed 50, the locally yielding transverse member 113 or 114 should come into contact with a bowling pin lying with its longitudinal axis substantially parallel to the longitudinal axis of the bowling alley bed 50, portions of the locally yielding transverse member 113 or 114 will become displaced laterally with respect to the longitudinal axis of the bowling alley bed 50, thus permitting the completing of the descent of the locally yielding transverse member 113 or 114 into its sweeping position.

*The bowling pins and balls handling mechanism*

Movable up and down in the supporting structure mounted athwart the bowling alley bed 50 is the bowling pins and balls handling mechanism, hereinafter called the handling mechanism, which comprises a main frame, a bowling pins and balls receiving chamber hereinafter called the receiving chamber, a bowling pins and balls separating mechanism hereinafter called the separating mechanism, a candle pins parallelizing mechanism hereinafter called the parallelizing mechanism, including a bowling pins transfer shelf hereinafter called the transfer shelf, and bowling pins setting chambers hereinafter called the setting chambers, carried in frames hereinafter on occasions, for the purpose of clarity, called sub-frames, all of which devices are carried by and in the main frame.

The main frame comprises the bedplate 125, the U-shaped side member 126, the first frame transverse member 127, the second frame transverse member 128, the third frame transverse member 129, the fourth frame transverse member 130, the two front sub-frame bearing extensions 131, and the two rear sub-frame bearing extensions 132, all welded together to form a rigid structure. The three extension lugs 133 secured to the main frame serve as three-point suspension means for the attachment of the main frame to the ends of the three flexible hoist cables 134 which run over the hoist pulleys 87, 88 and 91 and terminate at their other ends in cable eyes bearingly secured to the hoist drum 104 in the three slots 105 by the three pins 106. The main frame is also attached, at the two points of suspension 135, to the two flexible lift cables 136 which pass over the two front lift pulleys 95 and the two rear lift pulleys 84 and terminate at their other ends in cable eyes bearingly secured by the two shoulder screws 137 to the bowling pins and balls lift, hereinafter described. The two flanged front frame guide rollers 138, the two rear frame guide rollers 139, and the two bottom frame guide rollers 140 are bearingly secured to the main frame and they make contact with the front inwardly turned webs of the two upright channel members 59, thus serving as guides for the main frame in its movement up and down in the supporting structure.

The heretofore specified devices carried by and in the main frame, together with certain devices auxiliary to, and cooperating with, the heretofore specified devices carried by and in the main frame, will now be described sequentially.

*The receiving chamber*

The bedplate 125, the U-shaped side member 126, and the fourth frame transverse member 130 form the receiving chamber for the receiving of bowling pins and balls discharged by gravity from the bowling pins and balls collecting chamber of the bowling pins and balls lift, hereinafter described, upon the descent of the handling mechanism in the supporting structure and the elevation arcwise and tiltwise of the bowling pins and balls lift.

*The separating mechanism*

In order to effect the separation of bowling pins from bowling balls, the receiving chamber is provided with certain features of construction for the effectuation of such separating of bowling pins from bowling balls therein. The receiving chamber is provided with a circular rotatable floor 141 which, in the preferred embodiment of the present invention described and illustrated, is given the conformation of a squat cone and which rotates upon the centering pin 142 mounted upon the bedplate 125 and which is borne by the two rollers 143, bearingly secured to the main frame, and by the driving roller 144. The driving roller 144 is carried by the driving shaft 145, which is mounted in the two bearing blocks 146, and is driven by the handling motor 147 through the handling gear box 148. Within the receiving chamber are mounted vertical deflector plates 149, 150 and 151, shaped and positioned to form with portions of the U-shaped side member 126 around the circular rotatable floor 141 a substantially circular wall which in one region is deformed into an obtuse bulge 152, thus providing a floorless bowling ball receiving recess 153, and which in another region is supplied with an aperture 154 and is shaped into a floorless bowling pin receiving recess 155, the outer vertical wall of which recess is formed by and out of a portion of the U-shaped side member 126 and is spaced from the edge of the circular rotatable floor 141 a distance greater than the maximum diameter of a bowling pin, and one end of which recess, fitted with a shock-absorbing rounded-corner pin striker block 156, comprises an inflected surface, and the longitudinal axis of which recess is bisected by, and is approximately perpendicular to, a plane perpendicular to, and passing through the axis of rotation of, the circular rotatable floor.

The floorless bowling pin receiving recess 155 is fitted at its forward end with the shock-absorbing rounded-corner pin striker block 156 to arrest the circularly forward movement of each bowling pin as it leaves the circular rotatable floor 141 in entering into the floorless bowling pin receiving recess 155 and to deflect from the floorless bowling pin receiving recess 155 any second bowling pin competing for entrance into the floorless bowling pin receiving recess 155 while the upper portion of the floorless bowling pin receiving recess 155 is already occupied by a first bowling pin. The lower edge of that portion of the deflector plate 149 which is above the aperture 154, being positioned above the rim of the circular rotatable floor 141 and spaced from the upper surface of the circular rotatable floor 141 a distance greater than the maximum diameter of a bowling pin and less than the diameter of a bowling ball, serves as a guide rail to prevent bowling balls from entering into the floorless bowling pin receiving recess 155.

The floorless bowling ball receiving recess 153 is roofed over by the upper forward portion of the fourth frame transverse member 130, upon the under side of which is mounted the bowling balls retarding and deflecting member which, in the preferred embodiment of the present invention described and illustrated, consists of the bent flat leaf spring member 157, mounted at one of its ends upon the under side of the upper forward portion of the fourth frame transverse member 130. The utilization of such a bowling balls retarding and deflecting member permits, if and when desired, the utilization of a speed of rotation of the circular rotatable floor 141 higher than would be utilizable in the absence of such a device.

The obtuse bulge 152 in the substantially circular wall around the circular rotatable floor 141 is formed by the vertical bent deflector plate 151 positioned so that its straight portions are substantially tangential to the rim of the circular rotatable floor 141 and so that the inner surface of its bent portion forming the obtuse bulge 152 is spaced from the edge of the circular rotatable floor 141 a distance greater than the diameter of a bowling ball, so as to enable bowling balls to fall from the circular rotatable floor 141 through the floorless bowling ball receiving recess 153 and out of the receiving chamber onto the sloping bowling balls receiving member which, in the preferred embodiment of the present invention described and illustrated, is a ball trough 158 sloping downwardly towards each of its ends from the point of delivery of bowling balls thereonto, the direction of movement of bowling balls on or in the ball trough 158 being predetermined by the position of the adjustable baffle 159, shown in Fig. 27 in the position determining movement of bowling balls on or in the ball trough 158 to the left-hand side of the handling mechanism. Mounted upon, and at the delivery end of, the ball trough 158, the bearing block 160 carries a ball gate 161 which in normal or closed position lies across the end of the ball trough 158, thus preventing the delivery of bowling balls from the ball trough 158, and which is opened by being angularly displaced downwardly through coaction of the ball gate cam follower 162, carried by the ball gate 161 at its outer end, with one of the main cam members 66 upon the ascent of the handling mechanism in the supporting structure, thus permitting the delivery of bowling balls by gravity from the ball trough 158. The ball gate 161 is maintained in normal or closed position by the ball gate spring 163 interconnecting the main frame of the handling mechanism and the ball gate cam follower 162.

The crescent-shaped aperture between the inner surface of the vertical bent deflector plate 151 and the rim of the circular rotatable floor 141 is so proportioned that a bowling pin, however it may be disposed in a plane substantially parallel to the upper surface of the circular rotatable floor 141, cannot fall through the crescent-shaped aperture, the roof of the floorless bowling ball receiving recess 153 being so positioned over the circular rotatable floor 141 as to admit to the floorless bowling ball receiving recess 153 bowling balls and only such bowling pins as are disposed in a plane substantially parallel to the upper surface of the circular rotatable floor 141. The bowling pins deflector plates 164 and 165 are secured to the vertical bent deflector plate 151, the first bowling pins deflector plate 164 serving to prevent a bowling pin from riding upon another bowling pin into the floorless bowling ball receiving recess 153 and the second bowling pins deflector plate 165 serving to assist in keeping up the front ends of bowling pins riding through a portion of the floorless bowling ball receiving recess 153.

The separating mechanism just hereinbefore described, which is illustrated in Fig. 7, is shaped and proportioned particularly for the separating of candle pins and balls. For the most effective separating of other kinds of bowling pins and balls of different sizes and shapes, as, for example, ten pins and ten pin balls, so-called, it is quite desirable that the shapes, proportions and positions of various members and features of the separating mechanism be modified; namely, that the sizes of the floorless bowling pin receiving recess 155 and the floorless bowling ball receiving recess 153 be altered to accommodate bowling pins and balls, respectively, of different sizes; that the substantially circular wall surrounding the circular rotatable floor 141 be deformed into closer proximity to the rim of the circular rotatable floor 141 at the entrance end of the obtuse bulge 152; and that the bowling balls retarding and deflecting member 157 be positioned over the circular rotatable floor 141 so as to deflect bowling balls into the floorless bowling ball receiving recess 153. The last two modifications specifically indicated are generally illustrated in Fig. 7A.

*The parallelizing mechanism*

Located beneath the floorless bowling pin receiving recess 155 is a candle pin receiving trough, hereinafter called the pin trough, mutilated by the removal therefrom of its central portion leaving only the two hook-like members 166. Between these two hook-like members 166 are actuated inwardly the pusher members which, in the preferred embodiment of the present invention described and illustrated, consist of the two pusher fingers 167 rigidly secured at their lower ends to the tube 168 bearingly secured to the outer ends of the two crank arms 169 and 170 by the crank pin 171. The crank arm 169 is rigidly secured to the crank shaft 172 rotating in the bearing 173 mounted upon one of the rear sub-frame bearing extensions 132, and the crank arm 170 is rigidly secured to the crank shaft 174 rotating in the bearing 175 mounted upon the first frame transverse member 127, the crank shaft 174 being driven by the handling motor 147 through the handling gear box 148. Rigidly secured to the tube 168 is the pusher control arm 176 having, in the preferred embodiment of the present invention described and illustrated, a partly-arcuate cam surface coacting with the cam roller 177 bearingly secured to the first frame transverse member 127 by the pin 178, the partly-arcuate cam surface being held in contact with the cam roller 177 by the pusher control arm spring 179, the pusher control arm spring 179 tensionally interconnecting the lower end of the pusher control arm 176 and the pusher control arm spring bracket 180 mounted upon the first frame transverse member 127.

Rotation of the crank shaft 174 in the appropriate manner causes the crank pin 171 and the tube 168 to travel through a circular orbit, and, by virtue of the oscillation of the pusher control arm 176 upon the cam roller 177, causes the tips of the two pusher fingers 167 to travel in irregular circuits, first upwardly and inwardly between the two hook-like members 166, and then downwardly and outwardly below the two hook-like members 166, thus resulting in, and effectuating, the propulsion laterally of a candle pin from the pin trough, constituted by and of the two hook-like members 166, inwardly onto the transfer shelf. In the event of a candle pin becoming jammed between the tips of the two pusher fingers 167 and a part of the main frame, or in the event of candle pins becoming jammed upon the transfer shelf, the pusher control arm spring 179 yields to the force exterted by the jamming pins, thus permitting the pusher control arm 176 to lift from the cam roller 177 and thus permitting the completing, by the crank pin 171, of its circular orbit.

*The transfer shelf*

The transfer shelf onto which the candle pins are propelled laterally from the pin trough, constituted by and of the two hook-like members 166, consists, in the preferred embodiment of the present invention described and illustrated, of seven thin plates disposed beneath the circular rotatable floor 141 substantially in a horizontal plane and shaped into shallow V-shaped channels parallelly arranged and thirteen in number. The thin plate 181 nearest the pin trough comprises five shallow V-shaped channels, each of the successive five thin plates 182, 183, 184, 185 and 186 comprises one shallow V-shaped channel, and the thin plate 187 farthest removed from the pin trough comprises three shallow V-shaped channels. The thin plates 181, 183, 185 and 187 are longer than the thin plates 182, 184 and 186, and each of the thin plates 181, 183, 185 and 187 is welded at its forward end to the guide cross members 188 and under its rear end to the stiffening cross member 189, thus forming a rigid unit which is carried by the two frame plates 190 and 191 welded to the under side of this rigid unit. To the two frame plates 190 and 191 are welded the two studs 192 which are carried in the two bearings 193 mounted upon the end portions of the two front sub-frame bearing extensions 131 of the main frame.

The thin plate 182 adjacent one of its longitudinal edges is secured to the rod 194 which is carried in bearings mounted upon the guide cross member 188 and the stiffening cross member 189 adjacent the thin plate 183 and which is provided at one of its ends with the trapdoor lever arm 195. The thin plate 184 adjacent one of its longitudinal edges is secured to the rod 196 which is carried in bearings mounted upon the guide cross member 188 and the stiffening cross member 189 adjacent the thin plate 185 and which is provided at one of its ends with the trapdoor lever arm 197. The thin plate 186 adjacent one of its longitudinal edges is secured to the rod 198 which is carried in bearings mounted upon the guide cross member 188 and the stiffening cross member 189 adjacent the thin plate 187 and which is provided at one of its ends with the trapdoor lever arm 199. Three thin plates 182, 184 and 186 thus constitute three trapdoors in the transfer shelf and are provided with trapdoor lever arms for their actuation.

Extending above the surface of the transfer shelf and arranged in a line parallel with and adjacent the rear edge of the transfer shelf are six lugs 200 positioned, respectively, near the ends of the shallow V-shaped channels second, fourth, sixth, eighth, tenth and twelfth removed from the pin trough.

Welded to one end of the guide cross member 188 and to a portion of the outer edge of the thin plate 187 is a stop plate 201 which extends upwardly from the transfer shelf. The stop plate 201 has mounted upon its outer surface the bearing block 202 wherein is carried the pin 203 welded to the transfer shelf cam arm 204. The transfer shelf cam arm 204 carries at one of its ends the transfer shelf cam arm follower 205 bearingly secured thereto, and at the other of its ends one end of the link member 206 bearingly secured thereto: the other end of the link member 206 is bearingly secured to the link member 207, while the outer ends of the trapdoor lever arms 195, 197 and 199 are bearingly linked together by and with the link member 207. The trapdoors spring 208, tensionally interconnecting the guide cross member 188 and the link member 207 and limited in its action by the trapdoors stop member 209, serves to maintain the three thin plates 182, 184 and 186, constituting three trapdoors in the transfer shelf, normally in the horizontal plane of the transfer shelf. Inwardly directed displacement of the transfer shelf cam arm follower 205, causing movement leverwise of the transfer shelf cam arm 204, effects the openings downwardly of the three trapdoors in the transfer shelf.

Transverse and above the transfer shelf are positioned a plurality of candle pins aligning members, each comprising a rod 210 provided at and in its central portion with a longitudinal vane 211 and near one of its ends with a lever arm 212 and mounted for rotational movement in the first frame transverse member 127 and the second frame transverse member 128. The candle pins aligning members are positioned just below the bedplate 125 and above the transfer shelf and are spaced apart from the transfer shelf by distances such that the minimum distances between the transfer shelf and the rods 210 are greater than the maximum diameter of a candle pin and the maximum distances between the transfer shelf and the bottom edges of the longitudinal vanes 211, when the longitudinal vanes 211 are vertical, are less than the maximum diameter of a candle pin. The stop members 213 and the springs 214, interconnecting the first frame transverse member 127 and the outer ends of the lever arms 212 of the candle pins aligning members, serve to maintain the longitudinal vanes 211 of the candle pins aligning members normally in vertical planes.

Transverse and above the transfer shelf is positioned a power-disengaging member which comprises a rod 215 provided at and in its central portion with a longitudinal vane 216 and near one of its ends with a lever arm 217 and at that end with a power-disengaging arm 218 and mounted for rotational movement in the first frame transverse member 127 and the second frame transverse member 128. The power-disengaging member is positioned just below the bedplate 125 and is spaced apart from the stop plate 201 by a distance approximately the maximum diameter of a candle pin. The stop member 219 and the spring 220, interconnecting the first frame transverse member 127 and the outer end of the lever arm 217, serve to maintain the longitudinal vane 216 of the power-disengaging member normally in a vertical plane. Thus the power-disengaging member is responsive to displacement laterally of a candle pin upon the transfer shelf.

*The front setting chambers unit*

The front setting chambers unit performs the setting of the bowling pins 1, 2 and 3 in the conventional triangular arrangement of bowling pins utilized in the bowling games of candle pins, duck pins and ten pins.

The two frame plates 190 and 191, together with the stiffening member 221, form a frame, namely, the front sub-frame, which carries three setting chambers, collectively called hereinafter the three front setting chambers. The front sub-frame is bearingly secured to the main frame of the handling mechanism by the two studs 192 carried in the two bearings 193 in the two front sub-frame bearing extensions 131 mounted upon the first frame transverse member 127.

A first U-shaped member 222, suitably reinforced for the attainment of rigidity, is bearingly secured to the two frame plates 190 and 191 near their front ends by the two bearing pins 223 secured to the ends of the first U-shaped member 222 and carried in the two bearing blocks 224 welded to the two frame plates 190 and 191.

To the inner surface of, and within and at right angles to the central portion of, the first U-shaped member 222 is welded, at one of its ends, a tube, open at its other end and along its length, constituting the setting chamber 225 which performs the setting of the bowling pin 1 in the conventional triangular arrangement of bowling pins utilized in the bowling games of candle pins, duck pins and ten pins. The setting chamber 225 is provided with the setting chamber side plate 226 which is secured adjacent one of its longitudinal edges to the rod 227 carried in the pair of bearings 228 mounted upon the setting chamber 225 and rigidly secured at one of its ends to the setting chamber side plate lever arm 229. The outer end of the setting chamber side plate lever arm 229 is bearingly secured to one end of the link member 231, which is tensionally connected with the first U-shaped member 222 by the setting chamber side plate lever arm spring 230, and the other end of the link member 231 is bearingly secured to the outer end of the setting chamber side plate actuating cam lever arm 232. The inner end of the setting chamber side plate actuating cam lever arm 232 is bearingly secured to the first U-shaped member 222 and the central portion of the setting chamber side plate actuating cam lever arm 232 is bearingly secured to the setting chamber side plate actuating cam lever arm follower 233.

A second U-shaped member 234, suitably reinforced for the attainment of rigidity, is bearingly secured to the two frame plates 190 and 191 near their rear ends by the two bearing pins 235 secured to the ends of the second U-shaped member 234 and carried in the two bearing blocks 236 welded to the two frame plates 190 and 191.

To the inner surface of, and within and at right angles to the central portion of, the second U-shaped member 234 are welded, each at one of its ends, two tubes, each open at its other end and along its length, parallelly arranged, spaced apart from each other and lying in the same plane, constituting the setting chambers 237 and 238 which perform the setting of the bowling pins 2 and 3, respectively, in the conventional triangular arrangement of bowling pins utilized in the bowling games of candle pins, duck pins and ten pins. The setting chambers 237 and 238 are provided with the setting chamber side plates 239 and 240, respectively, which are secured, each adjacent one of its longitudinal edges, to the rods 241 and 242, respectively, carried in the pairs of bearings 243 and 244, respectively, mounted upon the setting chambers 237 and 238, respectively, and rigidly secured, each at one of its ends, to the setting chamber side plate lever arms 245 and 246, respectively. The outer ends of the two setting chamber side plate lever arms 245 and 246 are bearingly interconnected by the link member 247 and the link member 247 is tensionally interconnected with the second U-shaped member 234 by the setting chamber side plate lever arms spring 248. The center of the setting chamber side plate lever arm 245 is bearingly interconnected by the link member 249 with the outer end of the setting chamber side plates actuating cam lever arm 250, the inner end of the setting chamber side plates actuating cam lever arm 250 is bearingly secured to the second U-shaped member 234, and the central portion of the setting chamber side plates actuating cam lever arm 250 is bearingly secured to the setting chamber side plates actuating cam lever arm follower 251.

A portion of the front end of the frame plate 191 is fashioned into the cam surface 252 with which the setting chamber side plate actuating cam lever arm follower 233 coacts, the cam surface 252 being so shaped that when the setting chamber 225 is parallel to the plane of the transfer shelf, the setting chamber side plate actuating cam lever arm follower 233 is in its position of maximum outward displacement under the tension of the setting chamber side plate lever arm spring 230 and the setting chamber side plate 226 of the setting chamber 225 is displaced angularly, by rotation of the rod 227 in the pair of bearings 228, thus providing a lateral opening into the setting chamber 225 for the passage therethrough of a bowling pin precipitated into the setting chamber 225 from the transfer shelf downwardly and laterally by the downward angular displacement of the thin plate 184 operating as a trapdoor in the transfer shelf. Rotation of the setting chamber 225 towards vertical position by rotation of the first U-shaped member 222 upon the bearing pins 223 in the bearing blocks 224 causes the setting chamber side plate actuating cam lever arm follower 233 to traverse the cam surface 252 and to be displaced inwardly, thus causing the setting chamber side plate 226 to become angularly displaced and thus closing the lateral opening into the setting chamber 225. In the preferred embodiment of the present invention described and illustrated, during the initial twenty degrees angular rotation of the setting chamber 225 out of and away from a plane parallel to the plane of the transfer shelf, the setting chamber side plate actuating cam lever arm follower 233 moves inwardly: during the continuing seventy degrees angular rotation of the setting chamber 225 towards and into a plane perpendicular to the plane of the transfer shelf and during the returning seventy degrees angular rotation of the setting chamber 225 out of and away from a plane perpendicular to the plane of the transfer shelf, the setting chamber side plate actuating cam lever arm follower 233 is maintained in the inward position: during the final twenty degrees angular rotation of the setting chamber 225 towards and into a plane parallel to the plane of the transfer shelf, the setting chamber side plate actuating cam lever arm follower 233 moves outwardly: in all of these operations, the setting chamber side plate actuating cam lever arm follower 233 is under the tension of the setting chamber side plate lever arm spring 230.

A portion of the rear end of the frame plate 191 is fashioned into the cam surface 253 with which the setting chamber side plates actuating cam lever arm follower 251 coacts, the cam surface 253 being so shaped that when the setting chambers 237 and 238 are parallel to the plane of the transfer shelf, the setting chamber side plates actuating cam lever arm follower 251 is in its position of maximum outward displacement under the tension of the setting chamber side plate lever arms spring 248, and the setting chamber side plates 239 and 240 of the setting chambers 237 and 238, respectively, are displaced angularly, by rotations of the rods 241 and 242, respectively, in the pairs of bearings 243 and 244, respectively, thus providing lateral openings into the setting chambers 237 and 238, respectively, for the passages therethrough of bowling pins precipitated into the setting chambers 237 and 238, respectively, from the transfer shelf downwardly and laterally by the downward angular displacements of the thin plates 182 and 186, respectively, operating as trapdoors in the transfer shelf. Rotations of the setting chambers 237 and 238 towards vertical positions by rotation of the second U-shaped member 234 upon the bearing pins 235 in the bearing blocks 236 cause the setting chamber side plates actuating cam lever arm follower 251 to traverse the cam surface 253 and to be displaced inwardly, thus causing the setting chamber side plates 239 and 240 to become angularly displaced and thus closing the lateral openings into the setting chambers 237 and 238, respectively. In the preferred embodiment of the present invention described and illustrated, during the initial twenty degrees angular rotations of the setting chambers 237 and 238 out of and away from a plane parallel to the plane of the transfer shelf, the setting chamber side plates actuating cam lever arm follower 251 moves inwardly: during the continuing seventy degrees angular rotations of the setting chambers 237 and 238 towards and into a plane perpendicular to the plane of the transfer shelf and during the returning seventy degrees angular rotations of the setting chambers 237 and 238 out of and away from a plane perpendicular to the plane of the transfer shelf, the setting chamber side plates actuating cam lever arm follower 251 is maintained in the inward position: during the final twenty degrees angular rotations of the setting chambers 237 and 238 towards and into a plane parallel to the plane of the transfer shelf, the setting chamber side plates actuating cam lever arm follower 251 moves outwardly: in all of these operations, the setting chamber side plates actuating cam lever arm follower 251 is under the tension of the setting chamber side plate lever arms spring 248.

In order to insure the rotation of the setting chamber 225 into vertical position, the upper side of the first U-shaped member 222 and the under side of the transfer shelf are tensionally interconnected by and with the setting chamber rotating spring 254. In order to insure the rotations of the two setting chambers 237 and 238 into vertical positions, the upper side of the second U-shaped member 234 and the under side of the transfer shelf are tensionally interconnected by and with the setting chambers rotating spring 255.

In order to effect simultaniety of the contrary rotational movements of the setting chamber 225 and the setting chambers 237 and 238, lower portions of the first U-shaped member 222 and upper portions of the second U-shaped member 234 are bearingly interconnected by and with the two link members 256.

In order to effect the restoring of the three setting chambers 225, 237 and 238 from their vertical positions back into a plane parallel to the plane of the transfer shelf, lower portions of the first U-shaped member 222 are bearingly secured to ends of the two link members 257 and the other ends of the two link members 257 are bearingly secured to the outer ends of the two setting chambers restoring lever arms 258, respectively: the inner ends of the two setting chambers restoring lever arms 258 are rigidly secured to ends of the two shafts 259, respectively, which are carried in the two bearing blocks 260, respectively, welded to the frame plates 190 and 191, respectively: the other ends of the two shafts 259 are rigidly secured to the two setting chambers restoring quadrant pulleys 261, respectively; and to the peripheries of the two setting chambers restoring quadrant pulleys 261 are secured ends of the two setting chambers restoring flexible cables 262, respectively, and the other ends of the two setting chambers restoring flexible cables 262 are secured to the two brackets 264, respectively, welded to the under side of the bedplate 125.

In order to maintain the setting chambers 225, 237 and 238 in their normal positions in a plane parallel to the plane of the transfer shelf, the spring-actuated latch member 265 is bearingly secured to the setting chamber

225 near the outer end of the setting chamber 225, and the spring-actuated latch member 265 engages with the latch plate 266 secured to the second U-shaped member 234. Upward pressure upon the lower end of the spring-actuated latch member 265 disengages the upper end of the spring-actuated latch member 265 from the latch plate 266.

The positionings of the setting chamber 225 and the setting chambers 237 and 238 upon the first U-shaped member 222 and the second U-shaped member 234, respectively, and the positionings of the pairs of bearing pins 223 and 235, respectively, and the positionings of the pairs of bearing blocks 224 and 236, respectively, are such that when the setting chambers 225, 237 and 238 have been rotated into vertical positions, bowling pins 1, 2 and 3 contained by the setting chambers 225, 237 and 238, respectively, are then spaced apart by the distances intervening between bowling pins when they are in the playing positions prescribed by the rules of the bowling game being played. In the bowling games of candle pins, duck pins and ten pins, the distance between the centers of bases of adjacent bowling pins is twelve inches.

*The rear setting chambers unit*

The rear setting chambers unit performs the setting of the bowling pins 4, 5, 6, 7, 8, 9 and 10 in the conventional triangular arrangement of bowling pins utilized in the bowling games of candle pins, duck pins and ten pins.

The top cross member 267, the bottom cross member 268, the rear cross member 269, a plurality of vertical members 270, and the four lateral members 271 are welded together to form a rigid frame, namely, the rear sub-frame, which carries the several rear setting chambers. The rear sub-frame is bearingly secured to the main frame of the handling mechanism in a manner described hereinafter.

Rigidly secured to the sides of the rear sub-frame are the two main cam arms 272 having bearingly mounted upon their upper ends the two outwardly directed main cam arm followers 273 and having welded to their lower portions the two outwardly directed studs 274: the two outwardly directed studs 274 are carried in the two bearing blocks 275 mounted upon the inner sides of the lower end portions of the two rear sub-frame bearing extensions 132. Each of the four lateral members 271 carries a front split bearing 276 and a rear split bearing 277.

To the tube cross member 278 and at right angles thereto are welded, each near one of its ends, three open-ended tubes flared at their front ends, parallelly arranged, spaced apart from one another, and lying in the same plane, constituting the three setting chambers 279, 280 and 281 which perform the setting of the bowling pins 6, 5 and 4, respectively, in the conventional triangular arrangement of bowling pins utilized in the bowling games of candle pins, duck pins and ten pins. The three setting chambers 279, 280 and 281 are bearingly secured to the rear sub-frame by the four studs 282 welded to the sides of the three setting chambers 279, 280 and 281 and carried in the four front split bearings 276.

To the tube cross member 283 and to the tube rear plate 284 and at right angles to the tube cross member 283 and the tube rear plate 284 are welded, each proximate one of its ends, four open-ended tubes flared at their front ends, parallelly arranged, spaced apart from one another, and lying in the same plane, constituting the four setting chambers 285, 286, 287 and 288 which perform the setting of the bowling pins 10, 9, 8 and 7, respectively, in the conventional triangular arrangement of bowling pins utilized in the bowling games of candle pins, duck pins and ten pins. The four setting chambers 285, 286, 287 and 288 are bearingly secured to the rear sub-frame by the four studs 289 welded to the sides of the four setting chambers 285, 286, 287 and 288 and carried in the four rear split bearings 277.

In order to insure the rotation of the three setting chambers 279, 280 and 281 into vertical positions, the rear cross member 269 and the tube cross member 278 are tensionally interconnected by and with the setting chambers rotating springs 290. In order to insure the rotations of the four setting chambers 285, 286, 287 and 288 into vertical positions, the bottom cross member 268 and the tube cross member 283 are tensionally interconnected by and with the setting chambers rotating springs 291.

In order to effect simultaniety of the contrary rotational movements of the setting chambers 279, 280 and 281 and the setting chambers 285, 286, 287 and 288, respectively, the outer ends of the three downwardly directed setting chambers turning lever arms 292, each rigidly secured to one of the studs 282, respectively, and the outer ends of the three upwardly directed setting chambers turning lever arms 293, each rigidly secured to one of the studs 289, respectively, are bearingly interconnected by and with the three link members 294, respectively.

In order to effect the restoring of the seven setting chambers 279, 280, 281, 285, 286, 287 and 288 from vertical positions back into a plane parallel to the plane of the four lateral members 271, a setting chambers restoring quadrant pulley 295 is rigidly secured to one of the studs 282; and to the periphery of the setting chambers restoring quadrant pulley 295 is secured one end of the setting chambers restoring flexible cable 296, and the other end of the setting chambers restoring flexible cable 296 is secured to the third frame transverse member 129.

In order to maintain the seven setting chambers 279, 280, 281, 285, 286, 287 and 288 in their normal positions in a plane parallel to the plane of the four lateral members 271, the spring-actuated latch member 297 is bearingly secured to the setting chamber 280 near the outer end of the setting chamber 280, and the spring-actuated latch member 297 engages with the latch plate 298 secured to the tube rear plate 284. Upward pressure upon the lower end of the spring-actuated latch member 297 disengages the upper end of the spring-actuated latch member 297 from the latch plate 298.

The positionings of the three setting chambers 279, 280 and 281 and the four setting chambers 285, 286, 287 and 288 upon the tube cross member 278 and upon the tube cross member 283 and the tube rear plate 284, respectively, and the positionings of the four studs 282 and the four front split bearings 276 and of the four studs 289 and the four rear split bearings 277, respectively, are such that when the seven setting chambers 279, 280, 281, 285, 286, 287 and 288 have been rotated into vertical positions, bowling pins 6, 5, 4, 10, 9, 8 and 7 contained by the setting chambers 279, 280, 281, 285, 286, 287 and 288, respectively, are then spaced apart by the distances intervening between bowling pins when they are in the playing positions prescribed by the rules of the bowling game being played. In the bowling games of candle pins, duck pins and ten pins, the distance between the centers of bases of adjacent bowling pins is twelve inches, as has already been stated.

*Devices auxiliary to, and cooperating with, the handling mechanism*

In order to maintain the transfer shelf in its normal position parallel to the plane of the bedplate 125, the upper portions of the guide cross member 188 and the two brackets 299, welded to the under side of the bedplate 125, are tensionally interconnected by and with the two leveling springs 300. In order to assist in maintaining the four lateral members 271 in their normal positions parallel to the plane of the bedplate 125, the outer ends of the two leveling lever arms 301, each secured to a portion of a side of the rear sub-frame, carrying the seven setting chambers 279, 280, 281, 285, 286, 287 and 288, and the rear ends of the two spring-tensioning cam lever arms 303 are tensionally interconnected by and with the two leveling springs 302, and the two spring-tensioning cam lever arms 303 are bearingly secured intermediate their lengths to the upper portions of the sides of the main frame of the handling mechanism. To the front ends of the two spring-tensioning cam lever arms 303 are bearingly secured the two spring-tensioning cam lever arm followers 304 which, when the handling mechanism is in its upper position, coact with the two spring-tensioning cam plates 72, thus effecting an increased tension exerted by the two leveling springs 302.

In order to effect simultaniety of the angular displacements of the transfer shelf and the rear sub-frame carrying the setting chambers 279, 280, 281, 285, 286, 287 and 288, the upper portions of the guide cross member 188 and the upper ends of the two extension lever arms 305 are bearingly interconnected by and with the two link members 306, and the lower ends of the two extension lever arms 305 are welded to the top cross member 267.

In order to limit the downward angular displacement of the transfer shelf, the two stop plates 307 are rigidly secured to the under side of the bottom cross member 268 so as to project forward from the under side of the bottom cross member 268 to make contact with the under side of the stiffening cross member 189 of the transfer shelf when the transfer shelf is fully depressed.

In the preferred mode and manner of operation of the present invention, it is desirable that the openings of the three trapdoors in the transfer shelf be effected after the commencement of the upward angular restoring movement of the transfer shelf and that the closings of the three trapdoors in the transfer shelf be effected prior to and near the completion of the upward angular restoring movement of the transfer shelf. In order that this sequence of operations may be realized, the transfer shelf cam surface plate 308 is bearingly secured at one of its sides near its top edge to one of the rear sub-frame bearing extensions 132 by the shaft 309 which is carried in the bearing 310: to one end of the shaft 309 is secured the spring lever arm 311; and the outer end of the spring lever arm 311 and the rear sub-frame bearing extension 132 are tensionally interconnected by and with the transfer shelf cam latch spring 312 which serves to maintain the lower end of the transfer shelf cam surface plate 308 normally in contact with the stop plate 313 secured at one of its edges to the rear sub-frame bearing extension 132. The positioning of the transfer shelf cam surface plate 308 is such that when the transfer shelf is being angularly displaced downwardly, the transfer shelf cam arm follower 205 travels downwardly between the stop plate 313 and the outer surface of the transfer shelf cam surface plate 308, displacing inwardly the lower end of the transfer shelf cam surface plate 308 and then releasing the transfer shelf cam surface plate 308 so that it snaps back into contact with the stop plate 313; and when the transfer shelf is being angularly restored upwardly to its original position, the transfer shelf cam arm follower 205 travels upwardly and, for a portion of its path, inwardly over the inner surface of the transfer shelf cam surface plate 308, until it has traversed the length of the transfer shelf cam surface plate 308, and then the transfer shelf cam arm follower 205 jumps outwardly over the top edge of the transfer shelf cam surface plate 308 to snap back into contact with the stop plate 313. It will be seen that the transfer shelf cam surface plate 308 acts as a cam latch, determining the inward and outward movements of the transfer shelf cam arm follower 205 and thus timing and effecting the openings and the closings of the three trapdoors in the transfer shelf.

In order to guide the bowling balls discharged from the ball trough 158 onto the ball return 55, a tube 314 of material suitable and adequate for the effectuation of the purpose stated is stretched between the rigid hoops 315 and 316: the rigid hoop 315 is secured to one of the main cam members 66 and is positioned to receive bowling balls discharged by gravity from the ball trough 158 and the rigid hoop 316 is secured to one of the upright channel members 59 and is positioned immediately over the shock-absorbing pad 317 and the ball return 55: the bowling balls thus guided onto the ball return 55 are returned to the bowler by the ball return 55.

*The bowling pins and balls lift*

In order to effect the elevating above, and the discharging into, the receiving chamber of the handling mechanism of bowling pins and balls accumulated in the pit at the rear of the bowling alley bed 50 and the gutters 51, there is provided a bowling pins and balls lift, hereinafter called the lift, comprising a bowling pins and balls collecting chamber, hereinafter called the collecting chamber, carried by, and at ends of, two lift lever arms 318, while the other ends of the two lift lever arms 318 are bearingly secured to the two kickbacks 52 forward of the pit and below the level of the surface of the bowling alley bed 50 by the two studs 319, outer portions of the two conventional gutters 51 being removed to accommodate the two lift lever arms 318 when horizontal.

The collecting chamber comprises, in the preferred embodiment of the present invention described and illustrated, the two counterweight blocks 320 with downwardly and inwardly sloping upper surfaces, constituting the two lateral members of the collecting chamber, and a rear lift cross member 321 and a front lift cross member 322 rigidly interconnecting the two lateral members, the counterweight blocks 320, thus forming a collecting chamber frame; a shaped rear plate 323 bearingly secured adjacent its rear edge to the rear lift cross member 321; a middle floor plate 324 having an upwardly bent front portion, the middle floor plate 324 being hingedly connected along its rear edge to the front edge of the shaped rear plate 323 by the hinge 325 and being hingedly connected to the middle portions of the two retracting arms 326 by the two hinges 327, the lower ends of the two retracting arms 326 being bearingly secured to the front lift cross member 322; and a front plate 328 bearingly secured along its rear edge by the hinges 327 to the front edge of the upwardly bent front portion of the middle floor plate 324 and to the middle portions of the two retracting arms 326, while the upper portions of the two retracting arms 326, extending forwardly and upwardly from the two hinges 327, serve as stop means to arrest the forwardly and downwardly rotational movement of the front plate 328 when the front plate 328 is not otherwise supported. In Fig. 66, the front plate 328 is shown supported at its upper edge by the front wall of the pit when the collecting chamber, lying within the pit, is in extended and outwardly deformed position and condition. At the very initiating of the elevating of the collecting chamber from the pit, the upper edge of the front plate 328 slides upwardly upon the front wall of the pit until it reaches the upper edge of the front wall of the pit when, with continuing elevating of the collecting chamber from the pit, the under surface of the front plate 328 slides upon the upper edge of the front wall of the pit; the gradual forwardly and downwardly rotational movement of the front plate 328, as its under surface slides upon the upper edge of the front wall of the pit, is arrested by the upper portions of the two retracting arms 326, extending forwardly from the two hinges 327, and, with further elevating of the collecting chamber from the pit, contact between the under surface of the front plate 328 and the upper edge of the front wall of the pit is broken.

If materials of appropriate weights are utilized in the construction of the shaped rear plate 323, the middle floor plate 324, and the front plate 328, the front plate 328 will be overbalanced by the middle floor plate 324, and retraction and deformation inwardly of the collecting chamber will occur, and will be effected by gravity, upon the elevating of the collecting chamber from the pit floor 53. The four collecting chamber retracting springs 329, tensionally interconnecting the shaped rear plate 323 and the middle floor plate 324, pass over the two pins 330, welded to the middle floor plate 324 upon its upper surface and near its rear edge, and serve to assist in the retracting and deforming inwardly of the collecting chamber about the axis of rotation of the two hinges 325 upon the elevating of the collecting chamber from the pit floor 53 and further serve as closure members across the triangular areas formed between and bounded by the bottom inner edges of the two counterweight blocks 320, the lateral edges of the shaped rear plate 323, and the lateral edges of the middle floor plate 324 when the collecting chamber is retracted and deformed inwardly.

In order to effect the reextending and deforming outwardly of the collecting chamber when the collecting chamber is returning to the pit floor 53, the contact plate 331, secured to the pit floor 53, provides a smooth contact surface upon which the rear edge of the middle floor plate 324 may slide and by which upwardly directed pressure is impressed upon the rear edge of the middle floor plate 324 to reextend and deform outwardly the collecting chamber.

In order to accelerate the reextending and deforming outwardly of the collecting chamber into its extended and outwardly deformed condition when the lift is moving into its elevated position, the middle floor plate 324 and the pit floor 53 are interconnected by and with the pit spring 332 and the flexible pit cable 333 which passes over the front lift cross member 322 and the pit pulley 334 bearingly secured to the pit bracket 335 mounted upon the pit floor 53. The flexible pit cable 333, being of a length such that it hangs slackly from the front lift cross member 322 until the lift is midway in its upward travel, thereafter, through progressive elongation of the pit spring 332, exerts increasing tension upon the middle floor plate 324, displacing the middle floor plate 324 forwardly in respect to the front lift cross member 322 and thus tripping forwardly and downwardly the front plate 328 and the middle floor plate 324 and reextending and deforming outwardly the collecting chamber. Due to the arcwise and tiltwise movement of the lift, the reextending and deforming outwardly of the collecting chamber in its elevated position allows bowling pins and balls accumulated in the collecting chamber to be discharged by gravity forwardly and downwardly out of the collecting chamber into the receiving chamber of the handling mechanism. If materials of appropriate weights are utilized in the construction of the shaped rear plate 323, the middle floor plate 324, and the front plate 328, the reextending and deforming outwardly of the collecting chamber into its extended and outwardly deformed condition when the lift is moving into its elevated position will be effected by merely the resulting shiftings in the relations of the centers of gravity of the members of the collecting chamber and the points of suspension of the members of the collecting chamber effected by the elevation arcwise and tiltwise of the collecting chamber.

In order to prevent bowling pins from being discharged from the collecting chamber of the lift outside of the receiving chamber of the handling mechanism during the elevating of the collecting chamber of the lift and the lowering of the receiving chamber of the handling mechanism, two laterally extending ears 336 with upwardly extending front edges are welded to the sides of the middle floor plate 324 in positions such that the two laterally extending ears 336 constitute extensions of the front ends of the downwardly and inwardly sloping upper surfaces of the two counterweight blocks 320 when the collecting chamber of the lift is extended and deformed outwardly, and sweep backwardly and over the front portions of the downwardly and inwardly sloping upper surfaces of the two counterweight blocks 320 during the retracting and deforming inwardly of the collecting chamber of the lift, thus insuring the displacing of bowling pins from the downwardly and inwardly sloping upper surfaces of the two counterweight blocks 320 into the collecting chamber of the lift.

In order to fill out the remainder of the pit area so as to insure the collecting of the bowling pins and balls in the collecting chamber of the lift, the two gutter extensions 337 are provided to serve as prolongations of the two conventional gutters 51.

In order to effect the elevating and the lowering of the lift, two flexible lift cables 136, secured to the main frame of the handling mechanism at the two points of suspension 135, pass over the two pairs of lift pulleys 84 and 95 mounted upon the supporting structure and terminate in cable eyes bearingly secured by the two shoulder screws 137 to the outer faces of the two counterweight blocks 320 near their rear ends, thus providing for coupled reciprocal depression and elevation of the receiving chamber of the handling mechanism and the collecting chamber of the lift.

Shown in Figs. 72, 73 and 74 is an alternative construction of the collecting chamber of the lift utilizing the two lift lever arms 318, the two studs 319, the two counterweight blocks 320, the contact plate 331, and, if desired, the pit spring 332, the flexible pit cable 333, the pit pulley 334, and the pit bracket 335, hereinbefore described, which may be termed the pit spring ensemble. In this alternative construction, the two counterweight blocks 320 are interconnected by, and are rigidly secured to, a lift floor plate 338, the rear portion of the lift floor plate 338 being upwardly turned to form a lip: to the front edge of the lift floor plate 338 is bearingly secured the central portion of a front plate 339 which is bent along a line adjacent the line of its union bearingly with the front edge of the lift floor plate 338, so that the rear portion of the front plate 339 forms an overbalance for the front portion of the front plate 339: to the sides of the front portion of the front plate 339 are secured two laterally extending ears 340 so shaped and positioned as to sweep over the downwardly and inwardly sloping upper surfaces of the two counterweight blocks 320 when the front plate 339 is rotated about the axis of its union bearingly with the front edge of the lift floor plate 338. A stop cable 341 interconnecting the lift floor plate 338 and the rear edge of the rear overbalance portion of the front plate 339 serves to limit the retracting and deforming inwardly of the collecting chamber by limiting the upward and backward movement of the front edge of the front plate 339 when the collecting chamber is being elevated from the pit floor 53. The rear overbalance portion of the front plate 339 is so sufficiently heavier than the front portion of the front plate 339 as to cause the front portion of the front plate 339 to move backwardly and upwardly, within the limit permitted by the stop cable 341, upon the elevating of the collecting chamber from the pit floor 53. The elevating of the lift arcwise and tiltwise eventually causes the moment of the front portion of the front plate 339 to become greater than the moment of the rear overbalance portion of the front plate 339, resulting in the movement forwardly and downwardly of the front portion of the front plate 339 and the extending and deforming outwardly of the collecting chamber. Bowling pins and balls in the collecting chamber assist in effecting the extending and deforming outwardly of the collecting chamber by means of their weights and are, by reason of such extending and deforming outwardly of the collecting chamber, discharged by gravity forwardly and downwardly out of the collecting chamber of the lift into the receiving chamber of the handling mechanism.

In order to accelerate the extending and deforming outwardly of the collecting chamber into its extended and outwardly deformed condition when the lift is moving into its elevated position, the outer end of the hereinbefore described pit spring ensemble may be secured to the under side of the front portion of the front plate 339, thus serving to trip forwardly and downwardly the front edge of the front portion of the front plate 339 during a stage in the ascent of the lift. Towards the end of the descent of the lift when the collecting chamber is being returned to the pit floor 53, the rear edge of the rear overbalance portion of the front plate 339 comes into contact with the contact plate 331, and, by reason thereof, further descent of the lift causes the front edge of the front portion of the front plate 339 to become moved into its forward and downward position, thus resulting in the extending and deforming outwardly of the collecting chamber upon the pit floor 53.

*Electrical circuits and devices*

For the effectuation of the proper sequence of operations in the present invention, various stock items of the electrical trade are utilized, including the following devices: electric motor, by which is meant an electric motor of the type so wound as to permit reversal of rotation by the movement of a double-pole double-throw switch from one position to the position of opposite throw; sequence switch, by which is meant a switch so constructed that one inward movement of its actuating member causes an electrical circuit to be made through the switch, and the next inward movement of its actuating member causes the electrical circuit to be broken; solenoid-operated reversing switch, by which is meant a four-pole double-throw switch normally spring-held in one position of its throw, and thrown and held in the other position of its throw by the pull of a solenoid when and while current is applied to the solenoid coil of the solenoid-operated reversing switch; normal-off switch or normal-off limit switch, by which is meant a single-pole switch normally spring-held in open position with the electrical circuit being made when and while, but only when and while, pressure is applied to its actuating member; normal-on normal-off limit switch, by which is meant a normal-off limit switch fitted with an extra set of contacts and a contact bar providing a second electrical circuit, closed when the first set of contacts are open and open when the first set of contacts are closed.

*Location and status of switches when the present invention is inactive*

The normal-off bowler's starting switch 342, located at the bowler's end of the bowling alley bed 50, closes an electrical circuit only when its actuating member (button) is moved inwardly. A three-pole single-throw power switch 343 is located in the electrical control and junction box 107 and is utilized to disconnect the present invention from the source of electrical power when the present invention is not being utilized. Also located in the electrical control and junction box 107 is the solenoid-operated reversing switch 344, two of its four double-throw poles being utilized for the reversing of the reversible sweep motor 99 and the other two of its four double-throw poles being utilized for the reversing of the reversible hoist motor 96. The sequence switch 345, the normal-on normal-off sweep limit switch 346, and the normal-off hoist start limit switch 347 are mounted upon one of the thrust members 62 of the supporting structure, the sequence switch 345 and the normal-on normal-off sweep limit switch 346 being so positioned that their actuating members are moved out of their normal spring-loaded positions by contacts of their actuating members with one of the first sweep lever arms 108 when the sweep mechanism is in the elevated and retracted position, and the normal-off hoist start limit switch 347 being so positioned that its actuating member is momentarily tripped out of its normal spring-loaded position by one of the sweep actuating weights 109 near the beginning of the return of the sweep mechanism from its rearmost position, shown in broken lines in Fig. 1. The normal-on normal-off hoist limit switch 348 is mounted upon the top hoist pan 56 and is so positioned that its actuating member is maintained out of its normal spring-loaded position by contact of its actuating member with a striker plate 349, mounted upon the U-shaped side member 126 of the handling mechanism, when the handling mechanism is in its elevated position.

Carried by the handling mechanism are the remaining two limit switches, namely, the thirteenth-pin normal-on normal-off limit switch 350 and the transfer shelf tilt normal-off limit switch 352. The thirteenth-pin normal-on normal-off limit switch 350 is mounted upon the under side of the bedplate 125, and the outer end of its actuating member and the outer end of the power-disengaging arm 218 are bearingly interconnected by and with the link member 351 in such manner that the actuating member of the thirteenth-pin normal-on normal-off limit switch 350 is in its normal spring-loaded position when the shallow V-shaped channel of the transfer shelf thirteenth removed from the pin trough is not occupied by a candle pin, i. e., when the longitudinal vane 216 of the power-disengaging member is in vertical position. The transfer shelf tilt normal-off limit switch 352 is mounted upon the rear portion of the first frame transverse member 127 and is so positioned that the actuating member of the transfer shelf tilt normal-off limit switch 352 is held out of its normal spring-loaded position by contact with the guide cross member 188 when the transfer shelf is in a horizontal plane.

A green signal light 353 is mounted within the sight of the bowler and it becomes illuminated by reason of the closing of its electrical circuit after the bowling pins setting operations have been completed when bowling may be resumed.

All of the electrical circuits of the present invention are shown in the wiring diagram set forth as Fig. 75.

*The operation of the present invention*

In the At Rest positioned maintaned by the present invention during play, i. e., during actual bowling by the bowler, the electrical circuits of the electric motors 96, 99 and 147 are open: the handling mechanism is suspended in the supporting structure in its most elevated position by the three flexible hoist cables 134 wound or reeled upon the hoist drum 104: the sweep mechanism is maintained in its elevated and retracted position by the two flexible sweep cables 124 wound or reeled upon the two sweep drums 103: the lift is in its lowest position, with the collecting chamber reposing in extended and outwardly deformed condition upon the pit floor 53 and the two flexible lift cables 136 are slack: the setting chambers 225, 237, 238, 279, 280, 281, 285, 286, 287 and 288 are each loaded with a bowling pin and are maintained in a plane parallel to the plane of the bowling alley bed 50: the transfer shelf contains its full complement of thirteen bowling pins and is maintained in a plane parallel to the plane of the bowling alley bed 50 and parallel to the plane of the bedplate 125; and the receiving chamber of the handling mechanism may contain a few spare bowling pins if desired.

Upon the bowling alley bed 50 are set ten bowling pins in the conventional triangular arrangement of bowling pins utilized in the bowling games of candle pins, duck pins and ten pins. The bowler proceeds to bowl the number of bowling balls permitted and required by the rules of the bowling game being played.

When the number of bowling balls permitted and required by the rules of the bowling game being played have been bowled, then the bowler, wishing the bowling pins to be reset, presses the actuating member (button) of the bowler's start switch 342, thus closing the electrical circuit of the reversible sweep motor 99, causing the two sweep drums 103 to unwind or unreel the two flexible sweep cables 124, lowering the sweep mechanism, and moving one of the two first sweep lever arms 108 out of contact with the actuating member of the sequence switch 345 and out of contact with the actuating member of the normal-on normal-off sweep limit switch 346, thus breaking the electrical circuit to the green signal light 353 and maintaining the electrical circuit to the reversible sweep motor 99. The sweep mechanism continues to travel downwardly and then backwardly over the bowling alley bed 50 to the pit, with the locally yielding transverse member 113 or 114 maintained just above the surface of the bowling alley bed 50, sweeping the bowling pins and balls from the bowling alley bed 50 and the gutters 51 into the collecting chamber of the lift. When the sweep mechanism has reached its rearmost position adjacent the pit, the two flexible sweep cables 124 have become fully unwound or unreeled from the two sweep drums 103 which continue to rotate, now rewinding or rereeling the two flexible sweep cables 124 in the reverse manner, thus bringing forward the sweep mechanism in its path of return. Near the beginning of the path of return of the sweep mechanism, one of the two sweep actuating weights 109 makes, and momentarily maintains, contact with the actuating member of the normal-off hoist limit switch 347, momentarily closing the electrical circuit to, and starting, the reversible hoist motor 96, causing the three flexible hoist cables 134 to unwind or unreel from the hoist drum 104, lowering the handling mechanism in the supporting structure, and raising arcwise the lift whose collecting chamber becomes retracted and deformed inwardly. The lowering of the handling mechanism in the supporting structure causes the striker plate 349 to become withdrawn from the actuating member of the normal-on-normal-off hoist limit switch 348, thus permitting the actuating member of the normal-on normal-off hoist limit switch 348 to return to its normal spring-loaded position, thus maintaining the electrical circuit to the reversible hoist motor 96 and breaking the electrical circuit to the reversible sweep motor 99, with the result that the sweep mechanism comes to a stop in the guard position just above the surface of the bowling alley bed 50 forward of the handling mechanism, and there serves as a barrier against any bowling balls that might then be bowled. The continuing descent of the handling mechanism in the supporting structure also serves to withdraw the two spring-tensioning cam lever arm followers 304 from the spring-tensioning cam plates 72, thus releasing the tensions of the two leveling springs 302.

As the handling mechanism nears its lowest position of descent, the lift nears its highest position of ascent, with the result that tension is developed in the flexible pit cable 333 of the pit spring ensemble such as to displace forwardly the middle floor plate 324 of the collecting chamber, causing the bowling pins and balls accumulated in the collecting chamber to be discharged by gravity forwardly and downwardly out of the collecting chamber of the lift and into the receiving chamber of the handling mechanism.

Further downward movement of the handling mechanism in the supporting structure results in the making of contact between the bowling alley bed 50 and the spring-actuated latch members 265 and 297, disengaging the spring-actuated latch members 265 and 297 from the latch plates 266 and 298, respectively, thus permitting the setting chambers 225, 237, 238, 279, 280, 281, 285, 286, 287 and 288 to make contacts at their outer ends with the surface of the bowling alley bed 50 and to start to rotate into vertical positions.

The completion of the downward movement of the handling mechanism in the supporting structure occurs when the three flexible hoist cables 134 have become fully unwound or unreeled from the hoist drum 104: the hoist drum 104 continues to rotate, now beginning to rewind or rereel the three flexible hoist cables 134 in the reverse manner, thus initiating the ascent of the handling mechanism in the supporting structure and the descent of the lift whose collecting chamber again becomes retracted and deformed inwardly upon the release of the tension in the pit spring ensemble.

The continuing ascent of the handling mechanism in the supporting structure permits the rotatings of the setting chambers 225, 237, 238, 279, 280, 281, 285, 286, 287 and 288 to continue until the setting chambers 225, 237, 238, 279, 280, 281, 285, 286, 287 and 288 are in vertical positions with their open outer ends just above the surface of the bowling alley bed 50, thus permitting endwise displacements of the bowling pins, contained by and in the setting chambers 225, 237, 238, 279, 280, 281, 285, 286, 287 and 288 from the setting chambers 225, 237, 238, 279, 280, 281, 285, 286, 287 and 288 into standing positions upon the bowling alley bed 50, spaced apart in the conventional triangular arrangement of bowling pins utilized in the bowling games of candle pins, duck pins and ten pins, as shown in Fig. 46. During the ninety degrees angular rotations of the setting chambers 225, 237, 238, 279, 280, 281, 285, 286, 287 and 288 into vertical positions, the setting chamber side plates 226, 239 and 240 of the three front setting chambers 225, 237 and 238, respectively, carried by and in the front sub-frame, are displaced angularly into closed positions by the coaction of the setting chamber side plates actuating cam lever arms followers 233 and 251 with the cam surfaces 252 and 253, respectively.

Further ascent of the handling mechanism in the supporting structure lifts the setting chambers 225, 237, 238, 279, 280, 281, 285, 286, 287 and 288 into vertical positions above and clear of the ten bowling pins now standing upon the bowling alley bed 50, spaced apart in the conventional triangular arrangement of bowling pins utilized in the bowling games of candle pins, duck pins and ten pins. The two outwardly directed main cam arm followers 273 which, up to this stage of operation of the present invention, have been riding upon the inside surfaces of the rear inwardly turned webs of the two upright channel members 59 now come into contact with the two main cam latches 67, angularly displaced inwardly by the two main cam latch springs 69, and are ejected outwardly through the two openings 64 in the rear inwardly turned webs of the two upright channel members 59 and project onto the outer surfaces of the two main cam members 66, thus effecting, through the two main cam arms 272, the displacement, angularly and downwardly, of the rear sub-frame carrying the seven rear setting chambers 279, 280, 281, 285, 286, 287 and 288 and the consequent and concurrent exerting of tension upon the setting chambers restoring flexible cable 296, causing ninety degrees angular rotation of the setting chambers restoring quadrant pulley 295 and consequently and concurrently effecting ninety degrees angular rotations of the seven rear setting chambers 279, 280, 281, 285, 286, 287 and 288 back into their positions in the plane of the rear sub-frame wherein they are maintained by the engaging of the spring-actuated latch member 297 with the latch plate 298. The displacement, angularly and downwardly, of the rear sub-frame likewise causes movement rearwardly of the two extension lever arms 305 whose upper ends are bearingly interconnected with upper portions of the guide cross member 188 by the two link members 306, effecting simultaneously the displacements, angularly and downwardly, of the transfer shelf and the front sub-frame carrying the three front setting chambers 225, 237 and 238 and the consequent and concurrent exerting of tension upon the two setting chambers restoring flexible cables 262, causing ninety degrees angular rotations of the two setting chambers restoring quadrant pulleys 261, and consequently and concurrently effecting, through the two shafts 259, the two setting chambers restoring lever arms 258, the two link members 257, and the two link members 256, ninety degrees angular rotations of the three front setting chambers 225, 237 and 238 back into their positions in the plane of the front sub-frame wherein they are maintained by the engaging of the spring-actuated latch member 265 with the latch plate 266. During the ninety degrees angular rotations of the setting chambers 225, 237 and 238 back into their positions in the plane of the front sub-frame, the setting chamber side plates 226, 239 and 240 of the three front setting chambers 225, 237 and 238, respectively, carried by and in the front sub-frame, are displaced angularly into open positions by the coaction of the setting chamber side plates actuating cam lever arms followers 233 and 251 with the cam surfaces 252 and 253, respectively.

The displacement, angularly and downwardly, of the transfer shelf, carrying thirteen bowling pins lying in the thirteen parallelly arranged shallow V-shaped channels of the transfer shelf, causes the bowling pin thirteenth removed from the pin trough to be withdrawn from contact with the longitudinal vane 216 of the power-disengaging member, thus permitting the longitudinal vane 216, under the tension of the spring 220, to assume a vertical position and consequently and concurrently causing the thirteenth bowling pin normal-on normal-off limit switch 350 to return to its normal position with its contact points in the positions shown in the wiring diagram set forth as Fig. 75.

When the transfer shelf and the rear sub-frame carrying the seven rear setting chambers 279, 280, 281, 285, 286, 287 and 288 are in their positions of maximum downward angular displacement, with the stiffening cross member 189 in contact with the two stop plates 307, the longitudinal axes of the bowling pins first, third, fifth, seventh, ninth, eleventh and thirteenth removed from the pin trough, respectively, are coincidental with the longitudinal axes of the seven rear setting chambers 285, 279, 286, 280, 287, 281 and 288, respectively, i. e., the said seven bowling pins and the said seven setting chambers are in substantially the same plane, with the lower ends of the bowling pins registering with the upper open ends of the setting chambers; the said seven bowling pins are then, by gravity, longitudinally displaced slidingly from the parallelly arranged shallow V-shaped channels of the transfer shelf into the said seven setting chambers: the remaining six bowling pins second, fourth, sixth, eighth, tenth and twelfth removed from the pin trough are immobilized against longitudinal displacements, slidingly, by the six lugs 200. The positions of maximum downward angular displacements of the transfer shelf and the rear sub-frame are attained and maintained while the two main cam arm followers 273 are riding upwardly over the outer surfaces of the rearmost portions of the two main cam members 66.

During the displacement, angularly and downwardly, of the transfer shelf carrying thirteen bowling pins lying in the thirteen parallelly arranged shallow V-shaped channels of the transfer shelf, the transfer shelf cam arm follower 205 travelled downwardly outside of the transfer shelf cam surface plate 308 and the bottom edge of the transfer shelf cam surface plate 308 moved inwardly to permit the passage of the transfer shelf cam arm follower 205 to a point below the bottom edge of the transfer shelf cam surface plate 308. During the displacement, angularly and upwardly, of the transfer shelf, the transfer shelf cam arm follower 205 travelled, during the initial portion of its travel, vertically upwardly, then, for a portion of its travel, inwardly and upwardly, over the inner surface of the transfer shelf cam surface plate 308, causing the three thin plates 182, 184 and 186, constituting three trapdoors in the transfer shelf, to be displaced angularly and downwardly, thus effecting the precipitating of the three bowling pins sixth, eighth, and tenth removed from the pin trough, carried by the three thin plates 182, 184 and 186, downwardly and laterally into the three front setting chambers 238, 225 and 237, respectively. Completion of the upward travel of the transfer shelf cam arm folower 205 culminated in the jumping of the transfer shelf cam arm follower 205 outwardly over the top edge of the transfer shelf cam surface plate 308, which permitted the trapdoors spring 208 to effect the closings of the three trapdoors in the transfer shelf.

During the further ascent of the handling mechanism in the supporting structure, the lift approaches the lower limit of its travel, and the rear edge of the middle floor plate 324 of the collecting chamber comes into contact with the contact plate 331 secured to the pit floor 53. Upon further descent of the lift, the collecting chamber is re-extended and deformed outwardly by the movement, forwardly and upwardly, of the middle floor plate 324. During the further ascent of the handling mechanism in the supporting structure, the two spring tensioning cam lever arm followers 304 come into contact and coact with the two spring tensioning cam plates 72, effecting augumentations in the tensions being exerted by the two leveling springs 302 upon the rear sub-frame through the two leveling lever arms 301. Concurrently, the main cam arm followers 273 ride forwardly and upwardly over the upper sloping surfaces of the two main cam members 66, thus effecting, through the combined actions of the two leveling springs 300 and the two leveling springs 302, the restorings of the transfer shelf and the front sub-frame carrying the three front setting chambers 225, 237 and 238 and the rear sub-frame carrying the seven rear setting chambers 279, 280, 281, 285, 286, 287 and 288 into planes parallel to the plane of the bedplate 125 and, concurrently, the slackening of the two flexible restoring cables 262 and the flexible restoring cable 296 and the applying of pressure by the guide cross member 188 to the actuating member of the transfer shelf tilt limit switch 352 to close the electrical circuit of the handling motor 147.

During the final stage of the ascent of the handling mechanism in the supporting structure, the two main cam arm followers 273 complete their travels over the outer surfaces of the two main cam members 66 and, through the two openings at 65 in the rear inwardly turned webs of the two upright channel members 59, enter into the interiors of the two upright channel members 59 to travel upon the inner surfaces of the rear inwardly turned webs of the two upright channel members 59. Concurrently, the striker plate 349, secured to the U-shaped side member 126 of the handling mechanism, comes into contact with the actuating member of the normal-on normal-off hoist limit switch 348, moving the contacts of the normal-on normal-off hoist limit switch 348 to positions opposite to the positions shown in the wiring diagram set forth as Fig. 75, thus breaking the electrical circuit of the reversible hoist motor 96, terminating the ascent of the handling mechanism in the supporting structure, and remaking the electrical circuit of the reversible sweep motor 99, the rotation of which effects the further rotations of the two sweep drums 103 and the further windings or reelings of the two flexible sweep cables 124 upon the two sweep drums 103 and the elevating of the sweep mechanism into the elevated and retracted position shown in Fig. 1.

When the sweep mechanism has been elevated into the elevated and retracted positions shown in Fig. 1, one of the two first sweep lever arms 108 has come into contact with, and has exerted pressure upon, the actuating member of the normal-on normal-off sweep limit switch 346 and the actuating member of the sequence switch 345, thus effecting the breaking of the electrical circuit of the reversible sweep motor 99, the making of the electrical circuit to the green signal light 353, and the alternating of the electrical circuit of the solenoid-operated reversing switch 344, thus effecting the reversings of the windings of the reversible sweep motor 99 and the reversible hoist motor 96.

The closing of the electrical circuit of the transfer shelf normal off-tilt limit switch 352 by the restoring of the transfer shelf to a plane parallel to the plane of the bedplate 125 effects the starting of the handling motor 147, since the electrical circuit of the handling motor 147 and the normal-on normal-off thirteenth bowling pin limit switch 350 is closed because of the lack of a bowling pin in the shallow V-shaped channel of the transfer shelf thirteenth removed from the pin trough and substantially under the longitudinal vane 216 of the power-disengaging member. The rotation of the handling motor 147 effects the rotation of the circular rotatable floor 141, clockwise as viewed from above the circular rotatable floor 141, and causes the tips of the two pusher fingers 167 to travel in their irregular circuits. The bowling pins and balls that were discharged from and out of the collecting chamber of the lift and into the receiving chamber of the handling mechanism and onto the circular rotatable floor 141 are thereupon, by gravity and centrifugal force, whirled around and carried to the peripheral region of the circular rotatable floor 141; and from the peripheral region of the circular rotatable floor 141, the bowling balls, one by one, are discharged into and downwardly through the floorless bowling ball receiving recess 153 onto the ball trough 158 down which they roll to, and off of, the outer end of the ball trough 158, passing through the ball gate 161, through the rigid hoop 315, into the tube 314, through the rigid hoop 316, onto the shock-absorbing pad 317, and then onto the ball return 55 by which they are returned to the bowler's position; and concurrently, from the peripheral region of the circular rotatable floor 141, the bowling pins, one by one, are discharged into and downwardly through the floorless bowling pin receiving recess 155 into the pin trough, constituted by and of the two hook-like members 166, and from the pin trough, the bowling pins, one by one, are propelled laterally and inwardly onto the transfer shelf by the successively inward motions of the tips of the two pusher fingers 167 until finally ten bowling pins have been propelled onto the transfer shelf, thus effecting displacements laterally of three bowling pins erstwhile present upon the transfer shelf in the parallelly arranged shallow V-shaped channels second, fourth, and twelfth removed from the pin trough into the parallelly arranged shallow V-shaped channels eleventh, twelfth, and thirteenth removed from the pin trough, respectively. The displacement laterally of a bowling pin upon the transfer shelf into the shallow V-shaped channel thirteenth removed from the pin trough causes the longitudinal vane 216 of the power-disengaging member to be displaced angularly and upwardly into a substantially horizontal plane and to be maintained in a substantially horizontal plane by the bowling pin in the shallow V-shaped channel thirteenth removed from the pin trough, thus exerting pressure upon the actuating member of the normal-on normal-off thirteenth bowling pin limit switch 350, breaking the electrical circuit of, and stopping, the handling motor 147, and reclosing the electrical circuit of the normal-off hoist start limit switch 347, and thus restoring all of the initial conditions of operation of the present invention, save that the windings of the reversible sweep motor 99 and of the reversible hoist motor 96 have been reversed, and hence are ready for the initiation of a second cycle of operations.

In the utilization of the present invention for and in the setting of candle pins, the candle pins aligning members, hereinbefore described, serve by and in yielding rotationally to candle pins being displaced laterally upon the transfer shelf, to maintain parallel the candle pins as they are displaced laterally upon the transfer shelf.

It will be seen from the foregoing description of the construction and operation of the present invention and from the wiring diagram set forth as Fig. 75 that if for any reason the transfer shelf was not filled with its full complement of thirteen bowling pins, or if the transfer shelf and the front sub-frame and/or the rear sub-frame were not in planes parallel to the plane of the bedplate 125 when pressure was applied to the actuating member of the normal-off hoist start limit switch 347, the starting electrical circuit of the reversible hoist motor 96 would not be completed and the handling mechanism would not descend in the supporting structure, and, consequently, the sweep mechanism, instead of stopping at the guard position, would continue to travel forwardly and upwardly back to the elevated and retracted position maintained during play. It will also be seen that in the event that the transfer shelf has not been returned to a plane parallel to the plane of the bedplate 125, the electrical circuit to the handling motor 147 could not be completed, thus insuring that bowling pins will not be propelled onto the transfer shelf save when the transfer shelf is in, and only when the transfer shelf is in, the appropriate position for the receiving of bowling pins.

For purposes of clarity, the electrical circuits have been described and diagrammed in a simple form wherefrom have been omitted all relays and safety limit switches which might be utilized in commercial practice but which constitute no parts of the present invention.

While a preferred form and arrangement of the elements, members, parts and devices of the present invention have been described and illustrated in the specification and the accompanying drawings, it will be obvious to anyone skilled in the art that numerous changes and substantial modifications can be made in the form, construction and arrangement of the elements, members, parts and devices of the present invention without departing from the spirit and principles of the present invention. For example, common equivalents of mechanical parts of the preferred embodiment of the present invention described and illustrated may be utilized, e. g., trains of meshed gears or pulleys interconnected by cables or chains may be utilized in lieu of lever arms interconnected by link members. It should therefore be understood that the preferred embodiment of the present invention described and illustrated in the specification and the accompanying drawings is intended to be illustrative of the present invention and is not to be interpreted in any manner limitative of the scope of the present invention which is measured solely by the appended claims.

Having described my invention, I claim:

1. In an automatic bowling pin setter, a transfer shelf provided with channels parallelly arranged to receive bowling pins and having therein trapdoors hinged parellelly to the longitudinal axes of the channels.

2. In an automatic bowling pin setter, a transfer shelf provided with channels parallelly arranged to receive candle pins and having therein trapdoors spaced apart from one another by distances at least the breadth of a candle pin and hinged parallelly to the longitudinal axes of the channels.

3. In an automatic bowling pin setter, the combination of a frame, a sub-frame bearingly secured to the frame, a transfer shelf carried by the sub-frame and provided with channels parallelly arranged to receive bowling pins and having therein trapdoors hinged parallelly to the longitudinal axes of the channels, bowling pin setting chambers carried in the sub-frame and positioned parallel to and below the trapdoors to receive bowling pins discharged downwardly and laterally through the trapdoors when opened, and cam-actuated lever means distributed between the frame and the sub-frame for opening the trapdoors upon angular displacements of the sub-frame relative to the frame.

4. In an automatic bowling pin setter, the combination of a frame, a first number of bowling pin setting chambers parallelly arranged, each open at one of its ends and bearingly secured to the frame, a second number of bowling pin setting chambers parallelly arranged, each open at one of its ends, disposed between pairs of the first number of bowling pin setting chambers, and bearingly secured to the frame, link means distributed between the first number of bowling pin setting chambers and the second number of bowling pin setting chambers for angularly displacing the first number of bowling pin setting chambers and the second number of bowling pin setting chambers simultaneously in contrary rotational movement, and means for angularly displacing one of the numbers of bowling pin setting chambers.

5. In an automatic candle pin setter, the combination of a frame, a candle pins transfer shelf bearingly secured to the frame and provided with a plurality of channels parallelly arranged to receive candle pins and with a lesser number of lugs spaced apart along a transverse edge of the candle pins transfer shelf to immobilize selected candle pins upon the candle pins transfer shelf against longitudinal movement slidingly during angular displacements of the candle pins transfer shelf relative to the frame, a sub-frame bearingly secured to the frame and carrying candle pin setting chambers adapted to receive from channels of the candle pins transfer shelf non-selected candle pins by longitudinal displacements slidingly of the non-selected candle pins upon angular displacements of the candle pins transfer shelf and the sub-frame, respectively, and means for angularly displacing the candle pins transfer shelf and the sub-frame, respectively, relative to the frame.

6. In an automatic bowling pin setter, the combination of a frame, a first number of bowling pin setting chambers parallelly arranged, each bowling pin setting chamber open at one of its ends and bearingly secured intermediate its ends to the frame, a second number of bowling pin setting chambers parallelly arranged, each bowling pin setting chamber open at one of its ends, disposed between pairs of the first number of bowling pin setting chambers, and bearingly secured intermediate its ends to the frame, link means distributed between the first number of bowling pin setting chambers and the second number of bowling pin setting chambers for angularly displacing the first number of bowling pin setting chambers and the second number of bowling pin setting chambers simultaneously in mutually contrary rotational movement, and means for angularly displacing one of the numbers of bowling pin setting chambers.

7. In an automatic bowling pin setter, the combination of a frame, a bowling pin setting chamber open at one of its ends, bearingly secured to the frame, and provided with a longitudinal aperture in width sufficient to allow the passage of a bowling pin therethrough and a closure therefor, and cam-actuated means distributed between the bowling pin setting chamber and the frame for opening and closing the longitudinal aperture of the bowling pin setting chamber upon angular displacements of the bowling pin setting chamber relative to the frame and in a plane substantially vertical to the plane of the frame.

8. In an automatic bowling pin setter, the combination of a frame, a bowling pin setting chamber open at one of its ends, bearingly secured to the frame, and having a lateral portion in width slightly greater than the maximum thickness of a bowling pin and hinged parallelly to the longitudinal axis of the bowling pin setting chamber, and cam-actuated lever means distributed between the bowling pin setting chamber and the frame for actuating the hinged lateral portion of the bowling pin setting chamber upon angular displacements of the bowling pin setting chamber relative to the frame and in a plane substantially vertical to the plane of the frame.

9. In an automatic bowling pin setter, the combination of a supporting structure mounted above a bowling alley bed and a bowling pins setting mechanism movable vertically in the supporting structure and comprising a frame, a bowling pin setting chamber bearingly secured to the frame, latch means maintaining the bowling pin setting chamber in the plane of the frame and disengageable by contact with the bowling alley upon descent of the bowling pins setting mechanism in the supporting structure, and spring-tensional means interconnecting the bowling pin setting chamber and the frame for rotating into vertical position the bowling pin setting chamber during ascent of the bowling pins setting mechanism in the supporting structure.

10. In an automatic candle pin setter, in combination, a candle pins transfer shelf provided with channels parallelly arranged to receive candle pins and having therein trapdoors spaced apart from one another by distances at least the breadth of a candle pin and hinged parallelly to the longitudinal axes of the channels and mechanisms for separating bowling balls and candle pins and for delivering onto the candle pins transfer shelf the candle pins parallelly disposed.

11. In an automatic candle pin setter, the combination, with the combination of a frame, a sub-frame bearingly secured to the frame, a candle pins transfer shelf carried by the sub-frame and provided with channels parallelly arranged to receive candle pins and having therein trapdoors hinged parallelly to the longitudinal axes of the channels, candle pin setting chambers carried in the subframe and positioned parallel to and below the trapdoors to receive candle pins discharged downwardly and laterally through the trapdoors when opened, and cam-actuated lever means distributed between the frame and the sub-frame for opening the trapdoors upon angular displacements of the sub-frame relative to the frame, of mechanisms, carried by the frame, for separating bowling balls and candle pins and for delivering onto the candle pins transfer shelf the candle pins parallelly disposed.

12. In an automatic candle pin setter, the combination, with the combination comprising a frame, a candle pins transfer shelf bearingly secured to the frame and provided with channels parallelly arranged to receive a number of candle pins and with a lesser number of lugs spaced apart along a transverse edge of the candle pins transfer shelf to immobilize selected candle pins upon the candle pins transfer shelf against longitudinal movement slidingly during angular displacements of the candle pins transfer shelf relative to the frame, a sub-frame bearingly secured to the frame and carrying candle pin setting chambers adapted to receive from channels of the candle pins transfer shelf non-selected candle pins by longitudinal displacements slidingly of the non-selected candle pins upon angular displacements of the candle pins transfer shelf and the sub-frame, respectively, relative to the frame, and mechanism for displacing angularly the candle pins transfer shelf and the sub-frame, respectively, relative to the frame, of mechanisms, carried by the frame, for separating bowling balls and candle pins and for delivering onto the candle pins transfer shelf the candle pins parallelly disposed.

13. In an automatic candle pin setter, the combination, with the combination comprising a frame, a first sub-frame bearingly secured to the frame, a candle pins transfer shelf, carried by the first sub-frame and provided with channels parallelly arranged to receive a number of candle pins and with a lesser number of lugs spaced apart along a transverse edge of the candle pins transfer shelf to immobilize selected candle pins upon the candle pins transfer shelf against longitudinal movement slidingly during angular displacements of the first sub-frame relative to the frame, and having therein trapdoors hinged parallelly to the longitudinal axes of the channels, candle pin setting chambers carried in the first sub-frame and positioned parallel to and below the trapdoors to receive candle pins discharged downwardly and laterally through the trapdoors when opened, cam-actuated lever means distributed between the frame and the first sub-frame for opening the trapdoors upon angular displacements of the first sub-frame relative to the frame, a second sub-frame bearingly secured to the frame and carrying candle pin setting chambers adapted to receive from channels of the candle pins transfer shelf by longitudinal displacements slidingly of non-selected candle pins upon angular displacements of the first sub-frame and the second sub-frame, respectively, relative to the frame, of mechanisms, carried by the frame, for separating bowling balls and candle pins and for delivering onto the candle pins transfer shelf the candle pins parallelly disposed.

References Cited in the file of this patent

UNITED STATES PATENTS

| | | |
|---|---|---|
| 1,181,649 | Downey | May 2, 1916 |
| 1,190,645 | Hedenskoog | July 11, 1916 |
| 1,625,980 | Brinkman | Apr. 26, 1927 |
| 1,627,414 | Schaffer | May 3, 1927 |
| 1,706,271 | Williams | Mar. 19, 1929 |
| 1,806,274 | Williams | May 19, 1931 |
| 1,896,384 | White et al. | Feb. 7, 1933 |
| 1,911,436 | Cone | May 30, 1933 |
| 2,293,018 | Hagquist | Aug. 11, 1942 |
| 2,293,965 | Berg | Aug. 25, 1942 |
| 2,341,475 | Parra et al. | Feb. 8, 1944 |
| 2,346,189 | Schmidt | Apr. 11, 1944 |
| 2,498,587 | Snyder | Feb. 21, 1950 |
| 2,518,457 | Fretter | Aug. 15, 1950 |
| 2,531,167 | Simpson | Nov. 21, 1950 |
| 2,583,208 | Clark | Jan. 22, 1952 |
| 2,591,265 | Johns et al. | Apr. 1, 1952 |
| 2,616,694 | Montooth | Nov. 4, 1952 |
| 2,628,098 | Bauerschmidt | Feb. 10, 1953 |
| 2,668,713 | Anderson | Feb. 9, 1954 |
| 2,689,128 | Dowd et al. | Sept. 14, 1954 |